(12) United States Patent
Bodkin

(10) Patent No.: US 7,049,597 B2
(45) Date of Patent: May 23, 2006

(54) MULTI-MODE OPTICAL IMAGER

(76) Inventor: Andrew Bodkin, 43 Lehigh Rd., Wellesley, MA (US) 02482

( * ) Notice: Subject to any disclaimer, the term of this patent is extended or adjusted under 35 U.S.C. 154(b) by 327 days.

(21) Appl. No.: 10/325,129

(22) Filed: Dec. 20, 2002

(65) Prior Publication Data

US 2004/0119020 A1    Jun. 24, 2004

Related U.S. Application Data

(60) Provisional application No. 60/344,130, filed on Dec. 21, 2001.

(51) Int. Cl.
*G01J 5/08*    (2006.01)

(52) U.S. Cl. ............... 250/353; 250/338.1; 250/336.1; 250/214

(58) Field of Classification Search ............ 250/338.1, 250/336.1, 214 VT, 353, 214
See application file for complete search history.

(56) References Cited

U.S. PATENT DOCUMENTS

| | | | |
|---|---|---|---|
| 4,708,420 A * | 11/1987 | Liddiard | 359/199 |
| 5,136,312 A * | 8/1992 | Weaver et al. | 396/61 |
| 5,168,528 A * | 12/1992 | Field, Jr. | 382/103 |
| 5,191,469 A * | 3/1993 | Margolis | 359/366 |
| 5,841,574 A * | 11/1998 | Willey | 359/351 |
| 5,963,749 A * | 10/1999 | Nicholson | 396/421 |
| 6,178,346 B1 * | 1/2001 | Amundson et al. | 600/473 |
| 6,444,984 B1 * | 9/2002 | Lundgren et al. | 250/339.03 |
| 6,549,828 B1 * | 4/2003 | Garrot et al. | 701/1 |
| 6,665,116 B1 * | 12/2003 | Harvey et al. | 359/355 |
| 6,756,594 B1 * | 6/2004 | George et al. | 250/343 |
| 6,781,127 B1 * | 8/2004 | Wolff et al. | 250/332 |
| 2002/0180866 A1 * | 12/2002 | Monroe | 348/153 |
| 2003/0174238 A1 * | 9/2003 | Wu | 348/373 |
| 2004/0090623 A1 * | 5/2004 | Richman | 356/328 |
| 2004/0238724 A1 * | 12/2004 | Moody et al. | 250/214 VT |
| 2004/0252992 A1 * | 12/2004 | Hunter | 396/535 |
| 2005/0023445 A1 * | 2/2005 | Horn et al. | 250/214 R |
| 2005/0041144 A1 * | 2/2005 | Mitchell et al. | 348/376 |

* cited by examiner

*Primary Examiner*—Otilia Gabor
*Assistant Examiner*—Christine Sung
(74) *Attorney, Agent, or Firm*—Lathrop & Gage LC

(57) ABSTRACT

A common aperture, multi-mode optical imager for imaging electromagnetic radiation bands from a field of two or more different wavelengths is described. Fore-optics are provided to gather and direct electromagnetic radiation bands forming an image into an aperture of the multi-mode optical imager. The image is divided into two different wavelength bands, such as visible light and long-wave infrared. The first wavelength band (e.g., visible light) is detected by a first detector, such as a CCD array, for imaging thereof. The second wavelength band (e.g., long-wave infrared) is detected by a second detector, such as an uncooled microbolometer array, for imaging thereof. Additional optics may be provided for conditioning of the first and second wavelength bands, such as such as for changing the magnification, providing cold shielding, filtering, and/or further spectral separation.

41 Claims, 20 Drawing Sheets

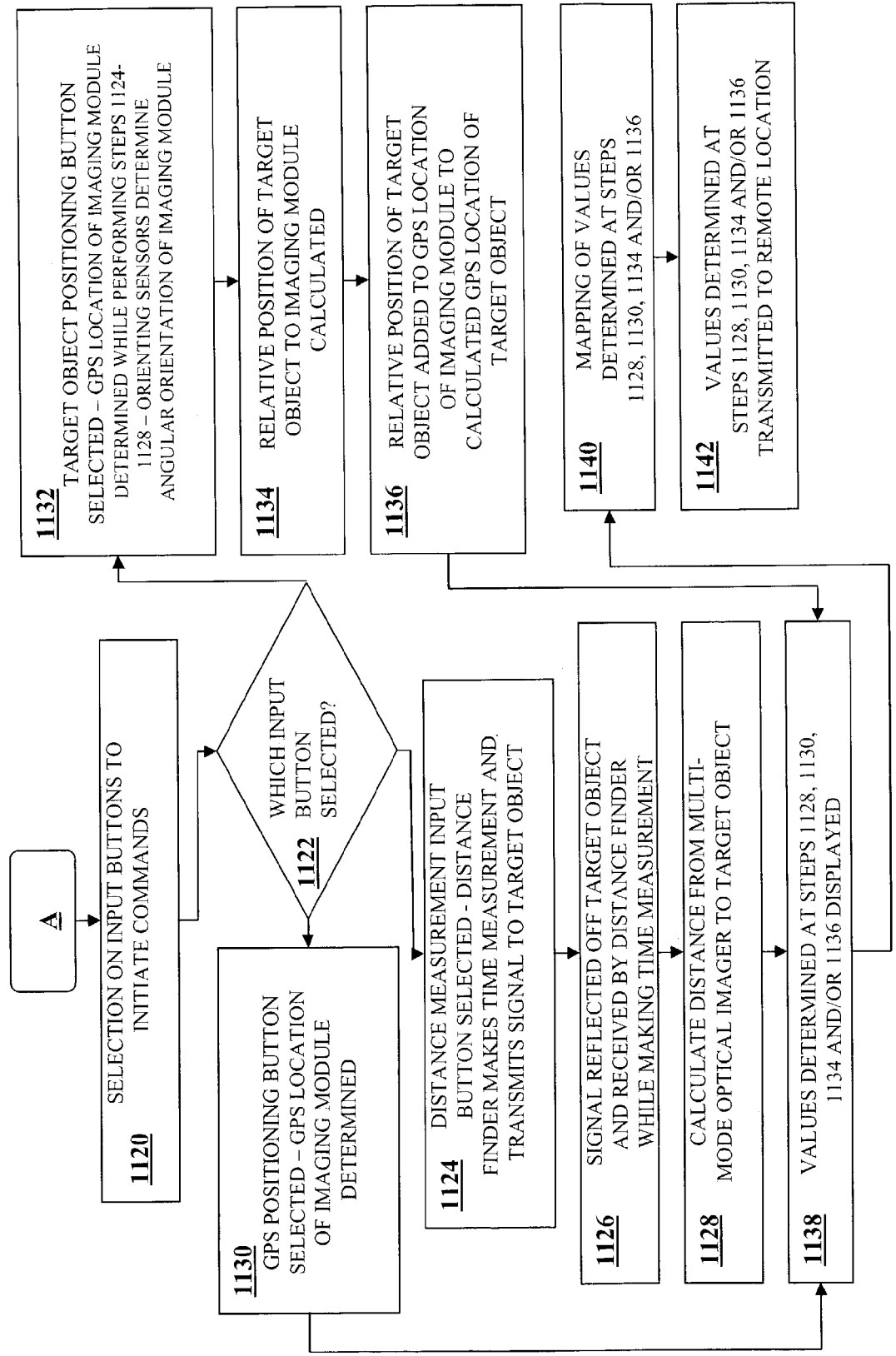

MULTI-MODE OPTICAL IMAGER

RELATED APPLICATIONS

This application claims priority to U.S. provisional application Ser. No. 60/344,130, filed Dec. 21, 2001, entitled "DUAL BAND ELECTRO-OPTIC IMAGER" and which is incorporated herein by reference.

BACKGROUND

Dual-mode imagers are known in the art to provide a device detecting both visible light and infrared radiation. However, current art dual-mode imagers are costly, complex, bulky and heavy. Further, refractive lenses often used in dual-mode imagers fair poorly in focusing an image having differing electromagnetic wavelengths. Other problems arise in dual-mode imagers when attempting to align pixel data for the differing electromagnetic wavelengths. Despite known military and commercial value, dual-mode imagers have not gained wide acceptance.

SUMMARY

A multi-mode optical imager is provided as a common aperture device for multiple bandwidth imaging. By this design, a simple and compact optical system is formed for such imaging while maximizing image quality and resolution.

In one aspect, a multi-mode optical imager is provided for simultaneous visible light and infrared imaging. The multi-mode optical imager has fore-optics that may provide image magnification and may, for example, utilize a broadband optical system such as mirrored telescope design (e.g., a Newtonian reflective telescope or a Cassegrain reflective telescope). The fore-optics receive electromagnetic radiation from a field of view of the multi-mode optical imager and focus such radiation through a common aperture, into an imaging module, to form an intermediate image at a focal plane of the fore-optics. In one example, the f-number of the fore-optics is considered a "moderate" f-number, for example f/4. The fore-optics may be interchangeable with other fore-optics to provide user customizable imaging specifications (e.g., to customize focal length, magnification, filters, cold shielding, and/or other desired separation, such as a spectral or polarization state). After passing through the fore-optics and the common aperture, the electromagnetic radiation may be divided by the imaging module into two bands, one being a visible light wavelength band ("channel I") and another being an infrared wavelength band ("channel II"). In one aspect, the imaging module includes a beam-splitter or filter, such as a dichroic beam-splitter, to divide the two bands. The visible light wavelength band is directed to a first detector along channel I for visible imaging and the infrared wavelength band is directed to a second detector along channel II for infrared imaging.

Those of skill in the art will appreciate that the systems and methods described herein may be implemented to support imaging of other desired wavebands (e.g., ultraviolet (UV), near infrared (NIR), midwave infrared (MWIR), millimeter waves, etc.) other than the infrared wavelength and visible bands, and may also be implemented in more than two wavelength bands. For example, in one aspect the multi-mode optical imager forms more than two channels (e.g., channel I, II and III) within the imaging module to accommodate more than two wavelength bands (e.g., visible light waveband, long-wave infrared (LWIR) waveband, and MWIR waveband), each channel having a corresponding detector. In another example, the imaging module supports imaging in one or more wavebands (e.g., visible light waveband and LWIR waveband) and is removable, so that a user can replace one imaging module with another imaging module supporting one or more other wavebands (e.g., MWIR waveband and UV waveband). Accordingly, the multi-mode optical imager of one aspect supports multiple imaging modules selectable by a user to accommodate imaging of several wavebands in accordance with user needs. In one aspect, each imaging module supports dual-mode imaging, each with channel I and channel II supporting two separate wavebands.

In yet another aspect, the imaging module after the common aperture includes an f-number reducer that processes the infrared wavelength band after the intermediate image into a lower f-number (e.g., f/1) image for detection by an uncooled microbolometer array infrared detector. The f-number reducer may be accomplished by several methods or combination of methods, for example: a) optical re-imaging and magnification reduction through transmissive lenses; b) a fiber optic taper; c) micro-optics of the microbolometer array image detector; d) an array of Compound Parabolic Concentrators (CPC); and/or (e) an array of hollow tapered capillaries.

Certain uncooled microbolometer array infrared detectors operate better with an f-number of about f/1. As one skilled in the art would appreciate, improvements in uncooled microbolometer infrared detectors may facilitate additional techniques of f-number reduction, or even eliminate f-number reduction within the imaging module. In one aspect, the imaging module does not substantially modify, or alternatively increase, the f-number of the infrared wavelength band after the intermediate image, so as to be nearly identical in f/# to the visible light waveband. The f-number reducer may be constructed of germanium or other infrared lens material (e.g., IR fused silica, zinc selenide, calcium fluoride, AMTIR-1).

In still another aspect, the divided channels I, II (e.g., for visible light and infrared wavebands) may include imaging optics to condition the visible light wavelength band and/or the infrared wavelength band. Such conditioning may, for example include: modifying f-number, modifying magnification, providing cold shielding, providing filtering, and/or providing spectral separation (e.g., hyperspectral imaging).

In another aspect, the detectors and imaging optics are combined into the monolithic imaging module. The imaging module has an interchangeable interface to facilitate attachment to different fore-optics. The different fore-optics may thus provide selectable optical characteristics, e.g., wide-to-narrow fields of view, microscopy, and/or other system features described herein.

Once the multi-mode optical imager is pointed at a target, additional information may be gathered about the target. In one aspect, a distance finder provides distance-to-target information to an operator. In one aspect, distance finding is performed via Doppler Shift, for applications such as astronomical observations: the Doppler Shift is generated by a signal emitted and received by the multi-mode optical imager. In another aspect, distance finding includes a time lapse determination between an emitted signal (e.g., from a laser within the multi-mode optical imager) and subsequent reception of the signal by the multi-mode optical imager. The signal may be of any wavelength for which the multi-mode optical imager is receptive. In still another aspect, distance finding may utilize the origin of a signal emitted from the target, and/or calculated from reflective material "painted" on the target, to which the multi-mode optical imager illuminates with an internally generated radiation source. In one aspect, distance finder signals (e.g., LIDAR) from the multi-mode optical imager may be sent through the same fore-optics used for reception of electromagnetic radiation. Additional imaging devices within the imaging module may further provide friend-or-foe detection.

In another aspect, a global positioning system ("GPS") provides the operator with the location of the multi-mode optical imager. The direction of aim may be provided by a magnetic compass, gyroscopic compass, multiple GPS receivers, inclinometer, accelerometer, rate gyros, and/or magnetometer, for example. With the implementation of the distance finder and GPS, the multi-mode optical imager may thus provide the location of a target.

In another aspect, image stabilization is provided by mechanical or post-processing means. Target tracking may be provided independently or in collaboration with image stabilization means.

In another aspect, the multi-mode optical imager is coupled with a vehicle, such as an unmanned aerial vehicle (UAV) or truck, so that a target object may be imaged, identified and targeted during surveillance activities.

In one aspect, a LWIR channel within the imaging module may be removed and replaced with a MWIR channel, and vice versa. This provides a "swappable" channel configuration to provide additional choices for a user. Accordingly, a user may swap one imaging module for another, in one aspect, and/or swap one channel with another channel within a given imaging module, in another aspect.

In one aspect, the multi-mode optical imager provides automatic target recognition (ATR) to identify a certain object (e.g., a tank) depending on the types of spectral bands within a specific wavelength band (e.g., visible light spectral bands within visible light wavelength band) that are detected by a detector array. ATR is used in conjunction with imaging of other wavebands (e.g., infrared wavelength band) to better identify the object in many ambient conditions. Dual-mode imagers were originally conceived to be missile seekers, to improve the man in the loop target recognition, and for use with onboard ATR processors. However, most ATR processors are trained on visible light data (e.g., from satellite or reconaissance plane), and have to use infrared missile data to finally identify a target and for homing in on the target. On the other hand, the multi-mode optical imager described herein gives the ATR the option to get visible light data, along with infrared data, for a more acurate identification of a target in various conditions (e.g., use visible light ATR during the day, infrared imaging at night, MMW imaging in foul weather, such as heavy precipitation).

The multi-mode optical imager of one aspect eliminates the need in the prior art to carefully align pixel data for differing wavelengths. By utilizing the common aperture for both the visible light waveband and the infrared waveband, the multi-mode optical imager can be formed as a smaller and more compact system with high optical sensitivity, as compared to the prior art.

BRIEF DESCRIPTION OF DRAWINGS

FIG. 15B shows another process for distance measurement and target marking with another multi-mode optical imager;

DETAILED DESCRIPTION OF DRAWINGS

Figure 1:
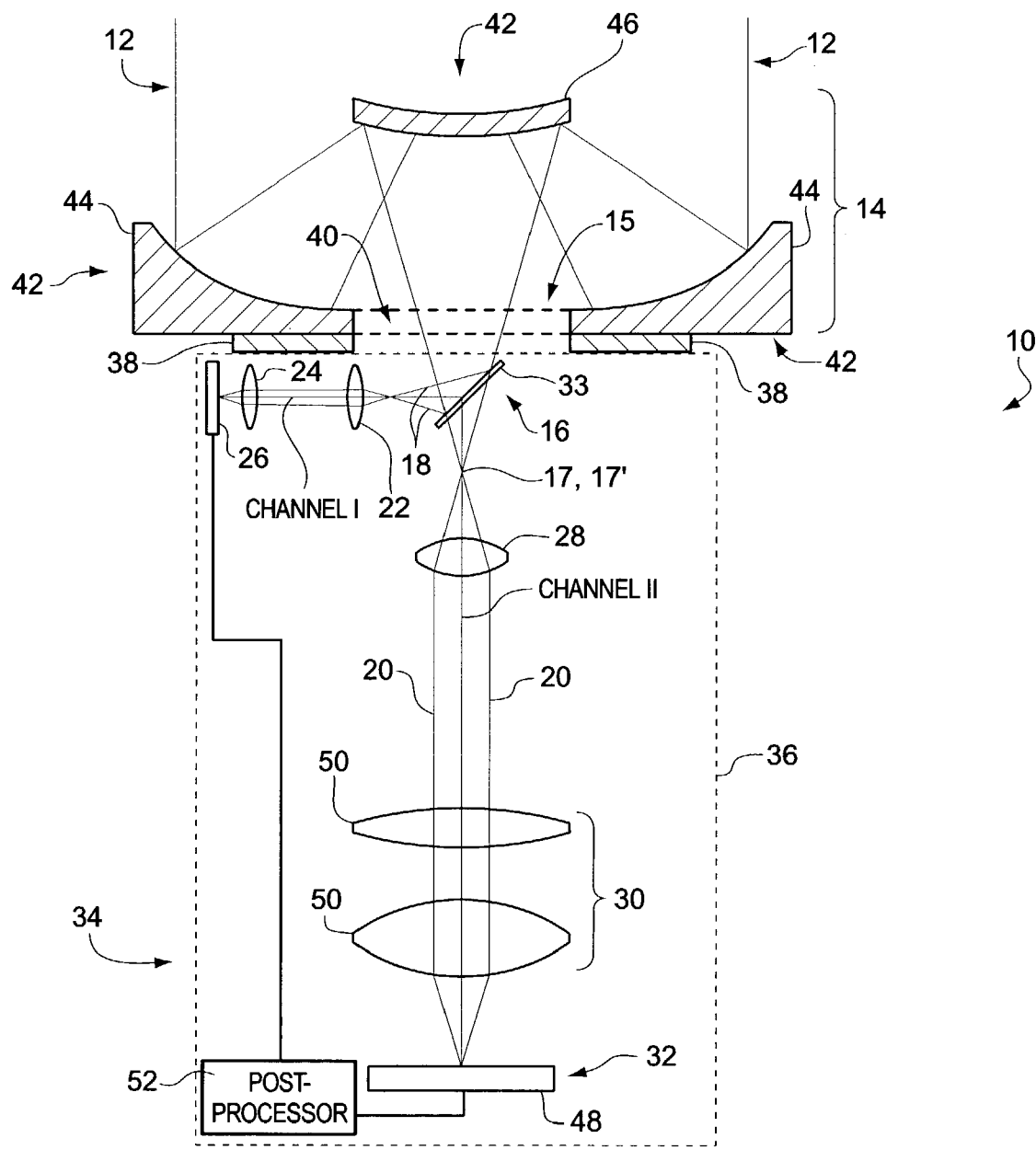
FIG. 1 is a schematic illustration of one multi-mode optical imager.

FIG. 1 shows one common aperture, multi-mode optical imager 10 for imaging electromagnetic radiation 12 encompassing two or more wavelength regions, such as visible light and infrared radiation. Fore-optics 14 magnify and direct electromagnetic radiation 12 into a common aperture 15 of multi-mode optical imager 10; a focal point 17 of fore-optics 14 is seen in FIG. 1. A filter or beam-splitter 16, positioned after the common aperture 15, divides electromagnetic radiation 12 into a visible light wavelength band 18 and an infrared wavelength band 20. Visible light wavelength band 18 is illustratively shown aligned along channel I and infrared wavelength band 20 is illustratively shown aligned along channel II. Channel I and channel II represent, respectively, optical axes along which visible wavelength band 18 and infrared wavelength band 20 are processed. For example, visible light wavelength band 18 is directed along channel I through a first field lens 22 and a magnifying or zoom lens 24 to a first optical detector 26 (or alternatively to a camera that detects visible light wavelength band 18). Infrared wavelength band 20 is directed along channel II through a second lens 28 (e.g., a second field lens) and an f-number reducer 30 to a second optical detector 32 (or alternatively to a camera that detects long-wave infrared wavelength band 20). Detection of visible light wavelength band 18 and infrared wavelength band 20, by first optical detector 26 and second optical detector 32, respectively, may be in the form of a still image at a certain point of time (i.e., when a shutter (not shown) opens, and subsequently closes, over common aperture 15 to allow electromagnetic radiation 12 therethrough) or a stream of video over a period of time.

In one embodiment, beam-splitter 16 (e.g., a dichroic beam-splitter 33) divides electromagnetic radiation 12 entering through common aperture 15 into visible light and infrared wavelength bands 18, 20, respectively, along channels I and II. First field lens 22 and zoom lens 24 provide magnification capabilities for the visible spectrum imaging of visible light wavelength band 18 with first optical detector 26. First field lens 22 directs visible light wavelength band 18 traveling from beam-splitter 16 to zoom lens 24, which focuses visible light wavelength band 18 onto first optical detector 26; zoom lens 24 facilitates zoom functionality to increase or decrease the magnification of the visible image captured by detector 26, selectably. First optical detector 26 may be a CCD or CMOS array, or other detector sensitive to visible light. Infrared wavelength band 20 is directed by second lens 28 traveling from beam-splitter 16 to optics of f-number reducer 30; f-number reducer 30 reduces the f-number of infrared wavelength band 20 prior to second optical detector 32. F-number reducer 30 may also be configured to provide zoom function to increase or decrease the magnification of the infrared image captured by the detector 32. Beam-splitter 16, first field lens 22, zoom lens 24, first optical detector 26, second lens 28, f-number reducer 30 and second optical detector 32 may be combined into an imaging module 34 that couples with various fore-optics (e.g., fore-optics 14) to capture and produce final images of electromagnetic radiation 12. A housing 36 encases the components of imaging module 34. First optical detector 26 and second optical detector 32 may, of course, be configured for sensitivity to wavebands other than visible light and infrared as a matter of design choice, depending on the desired image characteristics to be detected by multi-mode optical imager 10. For example, other wavebands may include ultraviolet, near infrared and millimeter waves. These wavebands may be configured and processed in place of bands 18 and/or 20, for example. Accordingly, multiple imaging modules 34 may include, for example, channels I and II that process preselected wavebands, wherein a user "swaps out" imaging module 34 with another module 34 to capture and image the desired electromagnetic spectrum 12.

Housing 36 may be configured with an interface 38 for attachment of varying fore-optics 14; such fore-optics 14 may provide a wide field of view, a narrow field of view, or any range therebetween, as a matter of design choice. In this way, housing 36 may accept fore-optics 14 that can be interchanged to alter multi-mode optical imager 10 focal length and zoom capabilities, and may thereby form, for example, a microscope or a telescope having a low f-number. A virtual focal plane 40 of fore-optics 14 is thus formed at interface 38, and the location of focal point 17 within imaging module 34 may be controlled by the particular optical properties of fore-optics 14. Furthermore, by this interface 38, various imaging modules 34 having differing imaging characteristics—imaging ultraviolet and midwave infrared wavebands (3–5 um), in one example—may be interchanged with fore-optics 14 to provide custom configuration in multiple bandwidth imaging with multi-mode optical imager 10.

In one embodiment, fore-optics 14 are formed of broad band curved reflectors 42, such as convex and/or concave mirrors, capturing a real image 17' of electromagnetic radiation 12. Reflective surfaces of reflectors 42 have a number of advantages over traditional refractive lenses when used with multi-mode optical imager 10. First, refractive lenses have indexes of refraction that change drastically between differing wavelengths of electromagnetic radiation, such as visible light and LWIR, leading to complex optical designs in order to avoid misfocus in all of the wavebands. Secondly, the reflective surfaces of reflectors 42 have a shorter fore-optic length as compared to refractive lenses. Furthermore, the reflective surfaces of reflectors 42 provide the additional benefit of nearly identical optical properties across a broad spectrum of wavebands. The curved reflectors 42 gather the incident visible light and infrared wavebands of electromagnetic radiation 12 in a way as to provide the same optical power in both visible light and infrared wavebands, while avoiding the focusing problems of refractive lenses. In one example, the curved reflectors 42 may include a concave mirror 44 forming aperture 15, and a convex mirror 46. Incident electromagnetic radiation 12 reflects off of concave mirrors 44 and is directed to convex mirror 46, which then focuses radiation 12 through aperture 15 and into imaging module 34. The fore-optics 14 may for example be a Cassegrain mirrored telescope or a Newtonian mirrored telescope. Those of skill in the art will appreciate that other broad band fore-optics 14 may be chosen depending on the desired optical properties of the multi-mode optical imager 10. Electromagnetic radiation 12 is focused by fore-optics 14 at focal point 17 forming a real intermediate image plane.

After passing through dichroic beam-splitter 33, infrared wavelength band 20 encounters f-number reducer 30. In one exemplary arrangement, fore-optics 14 produces an f/4 beam of infrared wavelength band 20 prior to f-number reducer 30; however, this f-number fore-optics 14 is a matter of design choice. F-number reducer 30 provides magnification and f-number reduction so that, for example, second optical detector 32 of channel II may be an uncooled microbolometer array 48 to detect infrared wavelength band 20. The f-number reduction of reducer 30 increase the image signal reducing the effect of secondary radiation (creating noise) within the detected image at second optical detector 32, since secondary radiation may emanate from, for example, housing 36 of imaging module 34. In one embodiment, f-number reducer 30 reduces the infrared wavelength band 20 to have an f-number that is matched to the requirement of uncooled microbolometer array 48 (e.g., f/1). F-number reducer 30 may include a number of transmissive lenses, shown as a pair of lenses 50 in FIG. 1. As a matter of design choice, f-number reducer 30 may alternatively or inclusively include fiber-optics (i.e., fiber optic bundle pulled to a taper), micro-optics located on uncooled microbolometer array 48 (see, e.g., FIG. 3), and/or other optics to provide magnification and f-number reduction. Lenses 50 of f-number reducer 30 may be fabricated of various optical materials, such as germanium, zinc selenide, calcium fluoride or AMTIR-1.

The production of high fidelity, broadband low f-number optics is known to be difficult. For this reason, f-number reducer 30 is positioned downstream from where infrared wavelength band 20 is divided off (i.e., downstream of beam-splitter 16) such that only infrared wavelength band 20 is affected. Additionally, because beam-splitter 16 (i.e., dichroic beam-splitter 33) and f-number reducer 30 each are designed to condition narrow wavebands, these conditioning optics can be relatively small—as compared to standard conditioning optics of the prior art—further lending to the lightweight and compact design of multi-mode optical imager 10.

A post-processor 52 may also be provided in imaging module 34. Post-processor 52 is coupled with first optical detector 26 and second optical detector 32 and may process digital image data representative of visible light and infrared wavelength bands captured by detectors 26, 32. Analysis by post-processor 52 may provide information about an object reflecting and/or emitting electromagnetic radiation 12, such as physical dimensions of the object, thermal energy emitted by the object, imaging characteristics of the object, etc.

Figure 2:
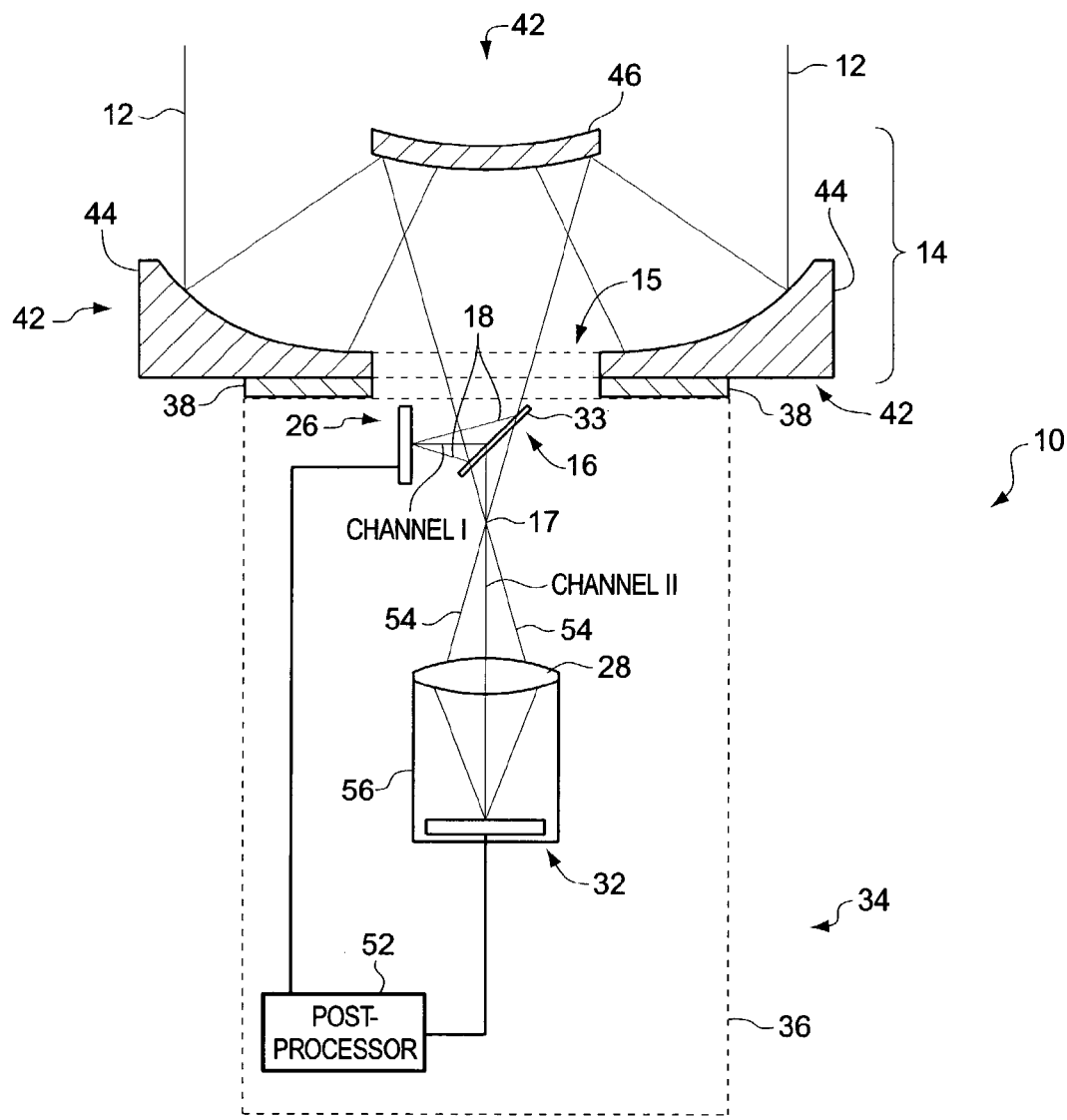
FIG. 2 is a schematic illustration of another multi-mode optical imager.

FIG. 2 shows one embodiment of multi-mode optical imager 10 with visible light wavelength band 18 aligned along channel I and a midwave infrared wavelength band 54 aligned along channel II. Beam-splitter 16 divides electromagnetic radiation 12 entering through common aperture 15 into visible light and midwave infrared wavelength bands 18, 54, respectively, along channels I and II. Visible light wavelength band 18 is detected by first optical detector 26, and midwave infrared wavelength band 54 travels through second lens 28, which focuses band 54 onto second optical detector 32 for detection thereof. A cold shield 56 may extend between second lens 28 and second optical detector 32 to shield detector 32 from detecting electromagnetic radiation emitted within the housing 36 itself, ensuring accurate detection of the midwave infrared wavebands present in electromagnetic radiation 12. The second lens 28 may also be cooled, further reducing the self emission radiation of the camera from the detected image. A post-processor, such as post-processor 52, may be coupled with first optical detector 26 and second optical detector 32 and may process digital image data representative of visible light and midwave infrared wavelength bands captured by detectors 26, 32. Post-processor 52 may analyze reflected and/or emitted electromagnetic radiation 12 from an object to learn information about the object.

FIG. 1 and FIG. 2 collectively illustrate another feature provided by a multi-mode optical imager, in accord with one embodiment. Specifically, in the embodiment, midwave band 54 along channel II is "swapped" out with longwave band 20, FIG. 1, to change which spectra of radiation 12 is imaged. By way of example, lens 28, f-number reducer 30, and detector 32 (e.g., microbolometer array 48) of FIG. 1 may be removed as a module assembly and replaced by lens 28, cold shield 56 and detector 32 (e.g., a PtSi detector) of FIG. 2 within module 34 as a matter of user preference.

Figure 3:
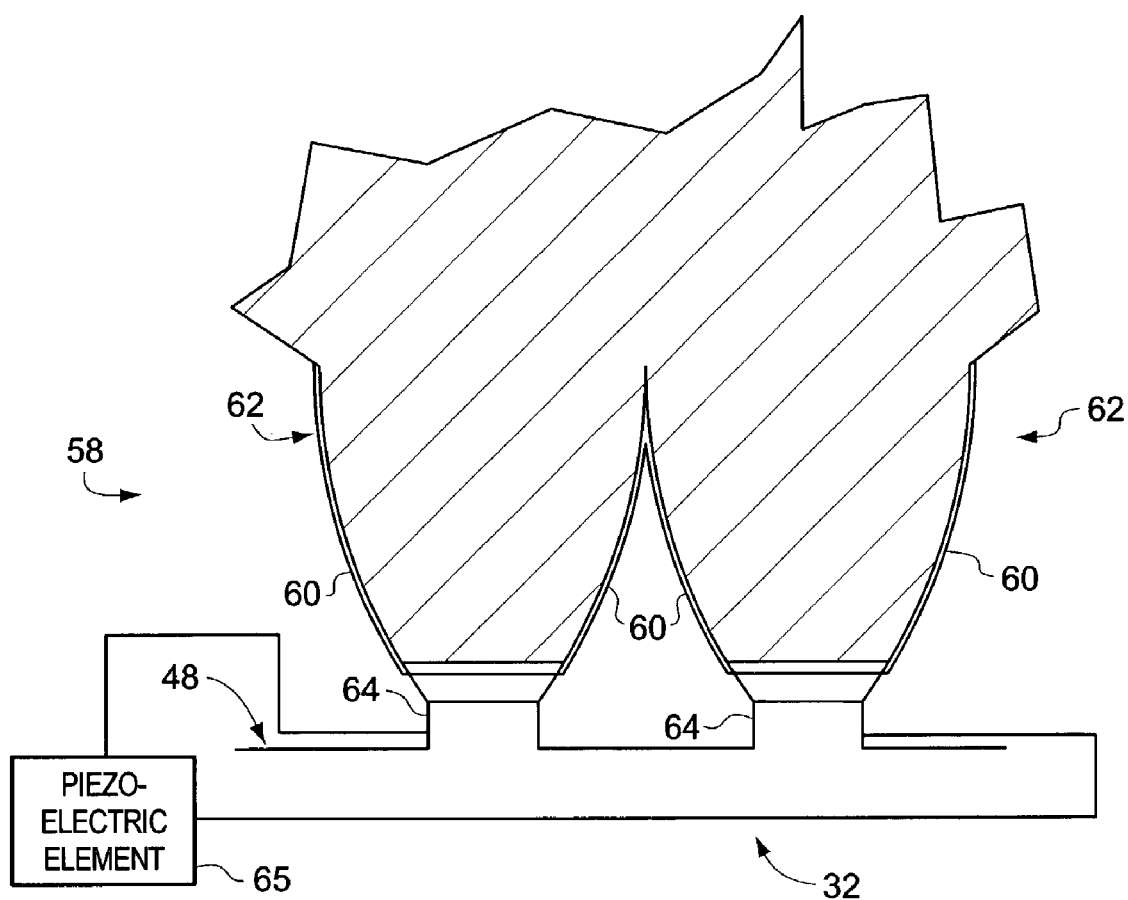
FIG. 3 shows a compound parabolic concentrator in use with an optical detector.

The details of micro-optics 58 located on uncooled microbolometer array 48 (i.e., second optical detector 32) are shown in FIG. 3, in accord with one embodiment. An array of concentrators 60, preferably forming a series of compound parabolic concentrators 62, are positioned adjacent to imaging pixels 64 of uncooled microbolometer array 48. Each compound parabolic concentrator 62 forms a generally conically-shaped mirror that may be fabricated from various materials, such as high index germanium that is transparent to 7–14 um infrared radiation and that has a high optical index which tends to facilitate detection of infrared wavelength band 20 by imaging pixels 64. The optical function of the compound parabolic concentrators 62 increases the f-cone, and consequently reduces the f-number of the incident infrared radiation at the imaging pixels 64. Accordingly, compound parabolic concentrators 62 provide certain advantages as compared to the prior art, including: allowing for smaller lenses within multi-mode optical imager 10 to produce the desired f-number at the uncooled microbolometer array 48; and reducing the size of imaging pixels 64 to increase the signal-to-noise ratio of multi-mode optical imager 10, making imager 10 more sensitive to LWIR of radiation 12. Moreover, by shifting the series of compound parabolic concentrators 62 directly off of imaging pixels 64 (i.e., adjacent to the pixels), the infrared wavelength band 20 is easily shuttered, aiding in calibration of multi-mode optical imager 10. In one embodiment, this shuttering is accomplished by a piezo-electric element 65 that expands and contracts, under control of imager 10, to shift, cyclically, concentrators 62 further from and then closer to pixels 64. As an alternative to the compound parabolic concentrators 62, an array of hollow tapered capillaries (not shown) may be positioned before second optical detector 32 to further reduce the f-number of longwave infrared wavelength band 20. Micro-optics 58, such as compound parabolic concentrators 62, may also be implemented with detectors for other wavebands, thereby increasing the signal-to-noise radio in a similar fashion.

Figure 4:
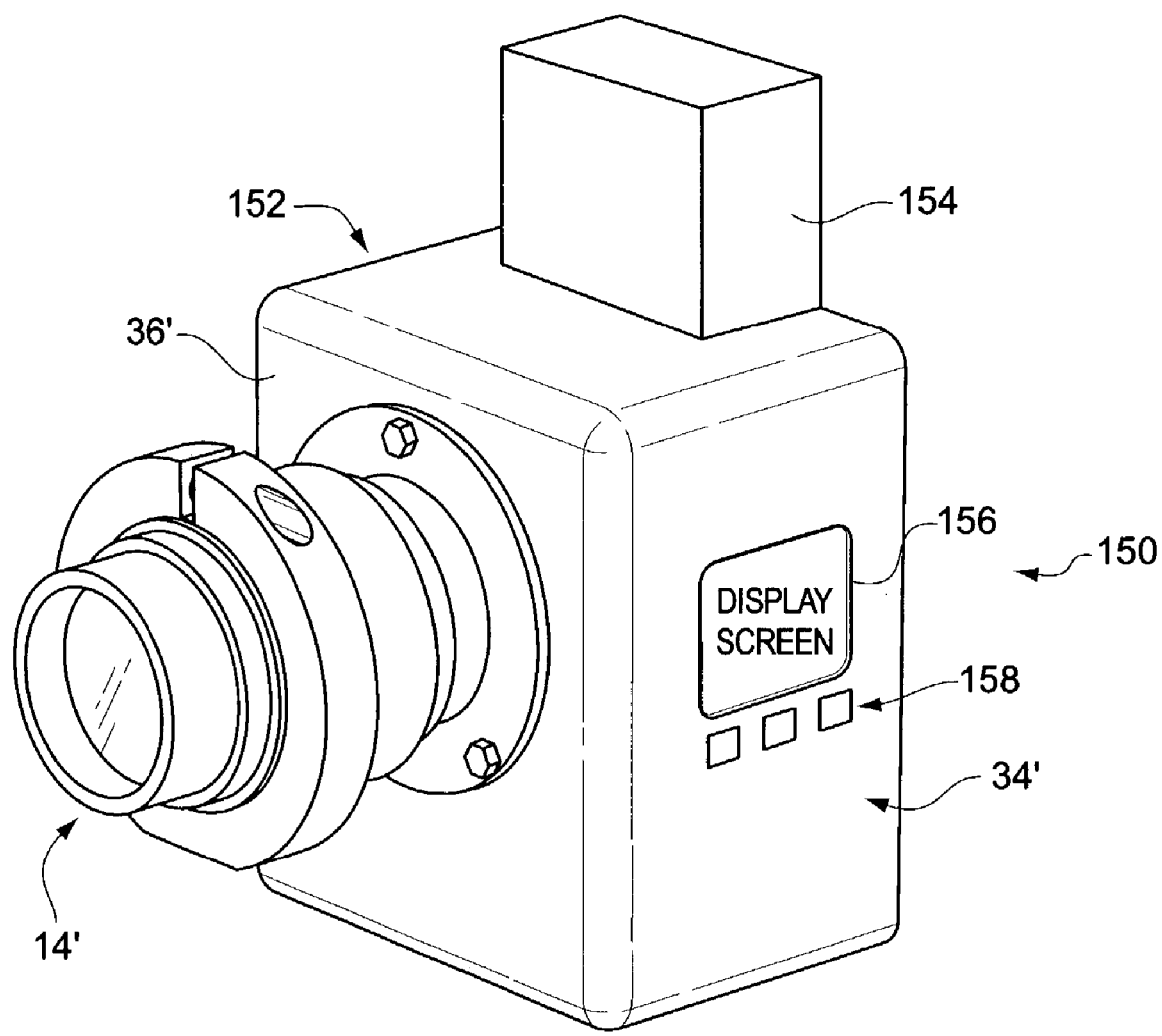
FIG. 4 is a perspective view of another multi-mode optical imager.

An exemplary multi-mode optical imager 150, having optical components similar to those of multi-mode optical imager 10, is shown in FIG. 4. Multi-mode optical imager 150 forms a camera 152 for capturing and imaging visible light and infrared wavelength bands. Fore-optics 14' are shown coupled to housing 36' of imaging module 34', which encases the internal optics (not shown), such as image splitter 16, first optical detector 26, f-number reducer 30 and second optical detector 32 of FIG. 1, for capturing visible light wavelength band 18 and infrared wavelength band 20, likewise of FIG. 1, to process and/or image multi-mode images. A shutter (not shown) is actuated to initiate image capture by allowing visible light and infrared wavelength bands to enter into imaging module 34'. This shutter may be used for periodic calibration of the visible and IR detector arrays, or may be, for example, installed only in an IR channel (e.g., channel II, FIG. 1) to allow for calibration of the IR channel alone. Electronics 154 (e.g., a microprocessor) couple with first optical detector 26 and second optical detector 32 to process the detected images in visible light wavelength band 18 and infrared wavelength band 20, such that a visual representation of the detected images may be shown, for example, on a display screen 156. Display screen 156 may for example be an LCD display positioned on optical imager 150, though those skilled in the art will appreciate that display screen 156 may also be positioned remote to imager 150 as a matter of design choice. Input buttons 158 may also be positioned on optical imager 150 and coupled with electronics 154, such that user selections on input buttons 158 may guide image capture by optical imager 150 and the characteristics and functions of display screen 156 (e.g., display of images of visible light wavelength band 18 and/or infrared wavelength band 20, overlay a map to determine location of object emitting and/or reflecting electromagnetic radiation 12 detected by optical imager 150, etc.).

In addition to the aforementioned components, imaging module 34 of multi-mode optical imager 10 may be equipped with various optics for conditioning of the visible light wavelength band 18 and the infrared wavelength band 20, so as to change the magnification, provide cold shielding, provide optical filtering, and/or provide desired spectral separation (e.g., for FTIR imaging, Hyperspectral imaging, or Raman spectroscopy). Thus, imaging module 34 may become a core component for a multi-mode optical imager for various applications, including: missile seekers/guidance, head mounted imagers, vehicle mounted imagers, stationary imagers, ground patrols, imagers for airborne reconnaissance (manned and unmanned vehicles, such as airplanes), friend-or-foe detection, surveying, bio-instrumentation, microscopy, substance detection (e.g., for homeland defense) and/or biological applications (e.g., tissue imaging).

Figure 5:
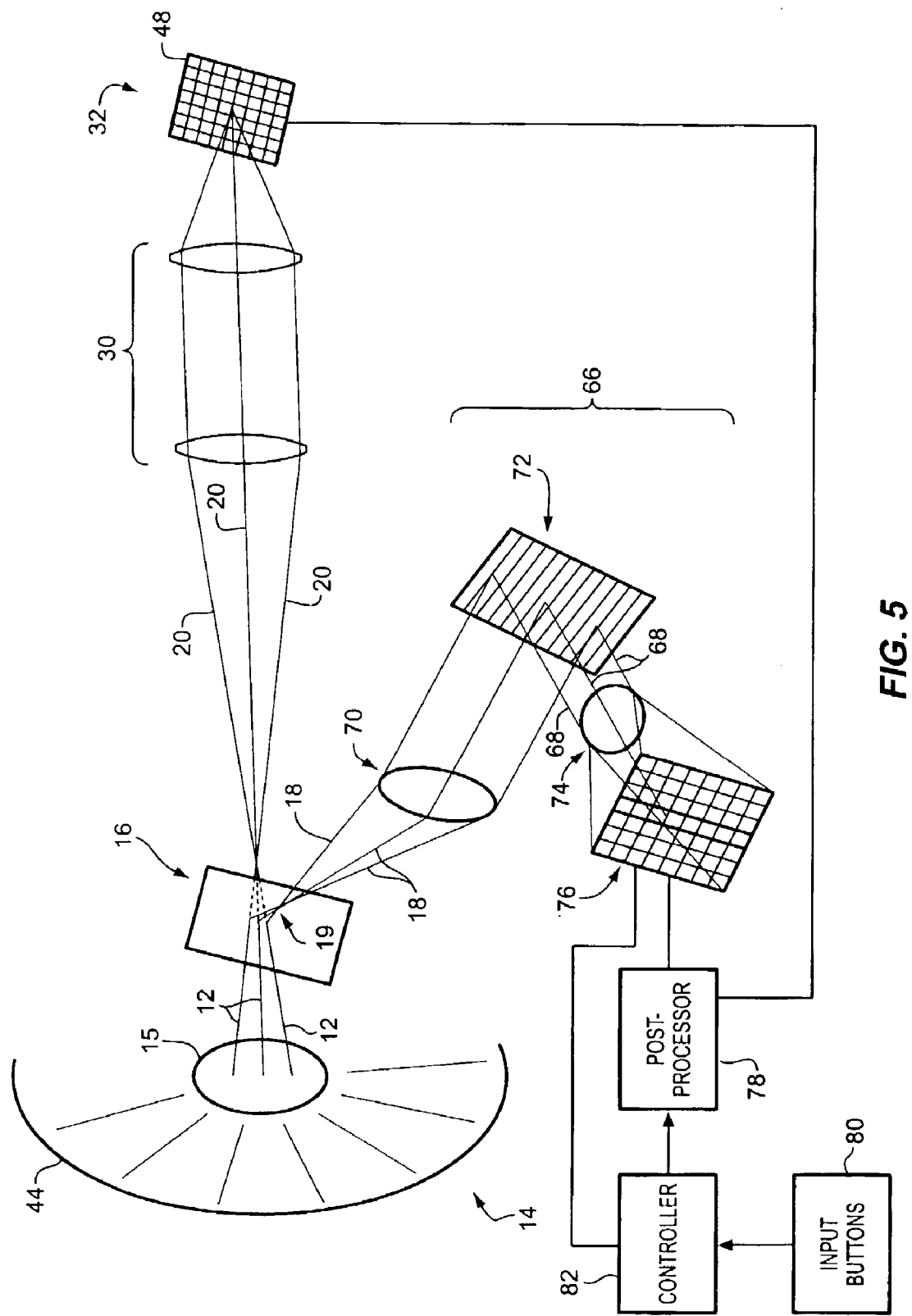
FIG. 5 is a schematic illustration of another multi-mode optical imager having a hyperspectral imager within an imaging module.

In one embodiment, shown in FIG. 5, a hyperspectral imager 66 is positioned within imaging module 34; hyperspectral imager 66 provides spectral separation of visible light wavelength band 18 into a diffracted spectrum band 68, for high precision sensing of the visible light wavelength portion of the electromagnetic radiation 12 given off by an object in the field of view of multi-mode optical imager 10. Hyperspectral imager 66 includes: a collimator 70 that collimates visible light wavelength band 18 after splitting at beam-splitter 16; a dispersing element 72, such as a diffraction grating or a prism, that separates various wavelengths of radiation within visible light wavelength band 18 into diffracted spectrum band 68; and an imaging lens 74 that focuses diffracted spectrum band 68 onto a visible detector array 76 to capture and image diffracted spectrum band 68 of visible light. Detector array 76 may be one-dimensional, providing spectral separation of diffracted spectrum band 68, or may be two-dimensional, providing both spectral and spatial separation of band 68. In a similar way this may be applied to hyperspectral imaging in the infrared bands using an infrared detector array in place of the visible light detector array. Those skilled in the art appreciate that hyperspectral imager 66 may further include a slit or array of micro lenslets (e.g., at location 19) that reduce the field of view thereof. A post processor 78 may also be coupled with detector array 76 for analysis of the captured diffracted spectrum band 68 (post processor 78 may for example be incorporated with or within processor 52, FIG. 1). For example, such analysis by post processor 78 may include examining the particular visible light wavelengths detected to aid in determining the chemical composition of an imaged object. Additional information can be obtained about the imaged object by coupling second optical detector 32 detecting infrared wavelength band 20 to post processor 78. By, for example, overlaying the detected image of infrared wavelength band 20 with the detected image of visible light wavelength band 18, the visual picture of the imaged object may be obtained while also viewing the heat signature (i.e., infrared radiation) emitted and/or reflected by the object. The overlaying of bands 18, 20 provides the feature of, for example, visual and thermal imaging (i.e., visual picture and heat signature). Visual and thermal imaging may be used to provide day/night target detection. Thus, with multiple waveband imaging, superior target detection is achieved because a range of ambient conditions (e.g., high/low levels of visible light) will not defeat the imaging abilities of imaging module 34.

To further control hyperspectral imagery, imaging module 34 may be provided with input buttons 80, similar to input buttons 158 of FIG. 4, and a controller 82, such as a microprocessor, to direct the processing by post-processor 78 according to user input to buttons 80. Controller may also control detector array 76 (and/or other detectors of imaging module 34), including, for example, shuttering operations of imager 34. Controller 82 may be incorporated with or within post-processor 78 as a matter of design choice. If a user desires to have information about an imaged object, one or more input buttons 158 may be depressed to instruct controller 82 to direct the processing by post-processor 78 of an image captured by hyperspectral imager 66. For example, post-processor 78 may be pre-programmed digitally with automatic target recognition (ATR) to identify a certain object (e.g., a tank) depending on the types of visible spectral bands within visible light wavelength band 18 that are detected by detector array 76. Upon the user depressing one or more of input buttons 80, controller 82 directs hyperspectral imager 66 to detect the visible light wavelength band 18, and second optical detector 32 to detect the infrared wavelength band 20, such that the images may be viewed on, for example, a display screen (i.e., display screen 156). The image may, of course, include still pictures or a stream of video pictures (e.g., MPEG) captured by multi-mode optical imager 10. Further identification or enhanced recognition of imaged objects may be achieved by processing the image detected by second optical detector 32 and, for example, overlaying the image with the image captured by hyperspectral imager 66.

Figure 6:
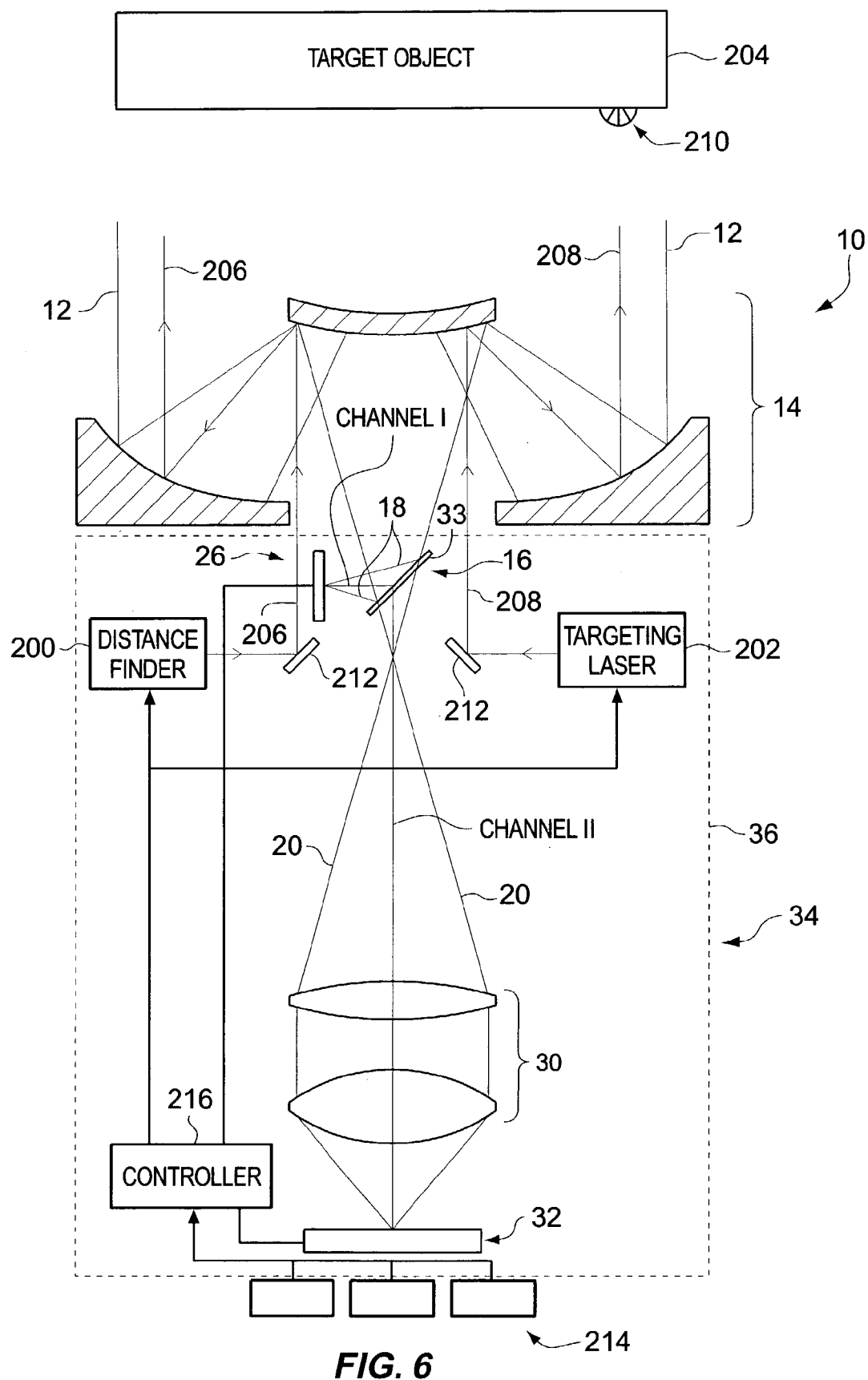
FIG. 6 is a schematic illustration of another multi-mode optical imager having a distance finder and a targeting laser.

Other components and systems may be incorporated into, or interfaced with, multi-mode optical imager 10. FIG. 6 shows a distance finder 200, such as a laser ranger, and a targeting laser 202 in imaging module 34 of multi-mode optical imager 10. One or both of distance finder 200 and targeting laser 202 may be located in multi-mode optical imager 10 as a matter of design choice. Distance finder 200 and/or targeting laser 202 operate when multi-mode optical imager 10 is aimed such that fore-optics 14 are aligned with a target object 204. In one embodiment, distance finder 200 sends a signal 206 out of multi-mode optical imager 10 through the common aperture 15 and fore-optics 14 used to capture electromagnetic radiation 12. The reflection of signal 206 off of target object 204 is then received by distance finder 200 in multi-mode optical imager 10. In this way, distance finder 200 provides the distance to target object 204 and communicates that distance to an operator of multi-mode optical imager 10. Distance finding may be performed via Doppler-shift, for applications such as astronomical observations, or time lapsed between the emission of signal 206 and the reception by the multi-mode optical imager 10. Signal 206 may be of any wavelength for which the multi-mode optical imager 10 is receptive, including laser, LIDAR and RADAR (e.g., millimeter waves). The origin of signal 206 may be from the target itself or from radiation reflected from a reflector "painted" on the target from imager 10 or another emitter linked to generate the radiation. Similar to distance finder 200, targeting laser 202 sends a laser beam 208 out of multi-mode optical imager 10 through common aperture 15 and fore-optics 14 to place a marker 210 on target object 204 for detection by multi-mode optical imager 10 or another system at a different location. In this way, another system, such as a missile guidance system, may detect marker 210 on target object 204, through surveillance or in communication with multi-mode optical imager 10, and may launch an attack against target object 204.

To transmit signal 206 and laser beam 208 out of multi-mode optical imager 10, a pair of beam-splitters or reflectors 212 are positioned within imaging module 34. Reflectors 212 may, for example, be sensitive to specific wavelengths of electromagnetic radiation, such as near infrared wavelengths (~1.5 um) in signal 206 and laser beam 208, to reflect such wavelength bands 206, 208 out of aperture 15 and through fore-optics 14 to target object 204. Input buttons 214 may be provided on housing 30 to provide an input means for a user to select a distance request to a sighted target object 204 by distance finder 200 and/or placing a targeting marker 210 on a sighted target object 204 by targeting laser 202. A controller 216, which may be microprocessor controlled, for example, receives the user selections from input button 214 and generates command signals communicated to distance finder 200 and targeting laser 202 for operation thereof based on the user input. Controller 216 may also control detectors 26, 32 and any shuttering operations, as a matter of design choice.

Those skilled in the art appreciate that reflectors 212 may be positioned directly within channels I, II as beam-splitters, similar to splitter 33.

Figure 7:
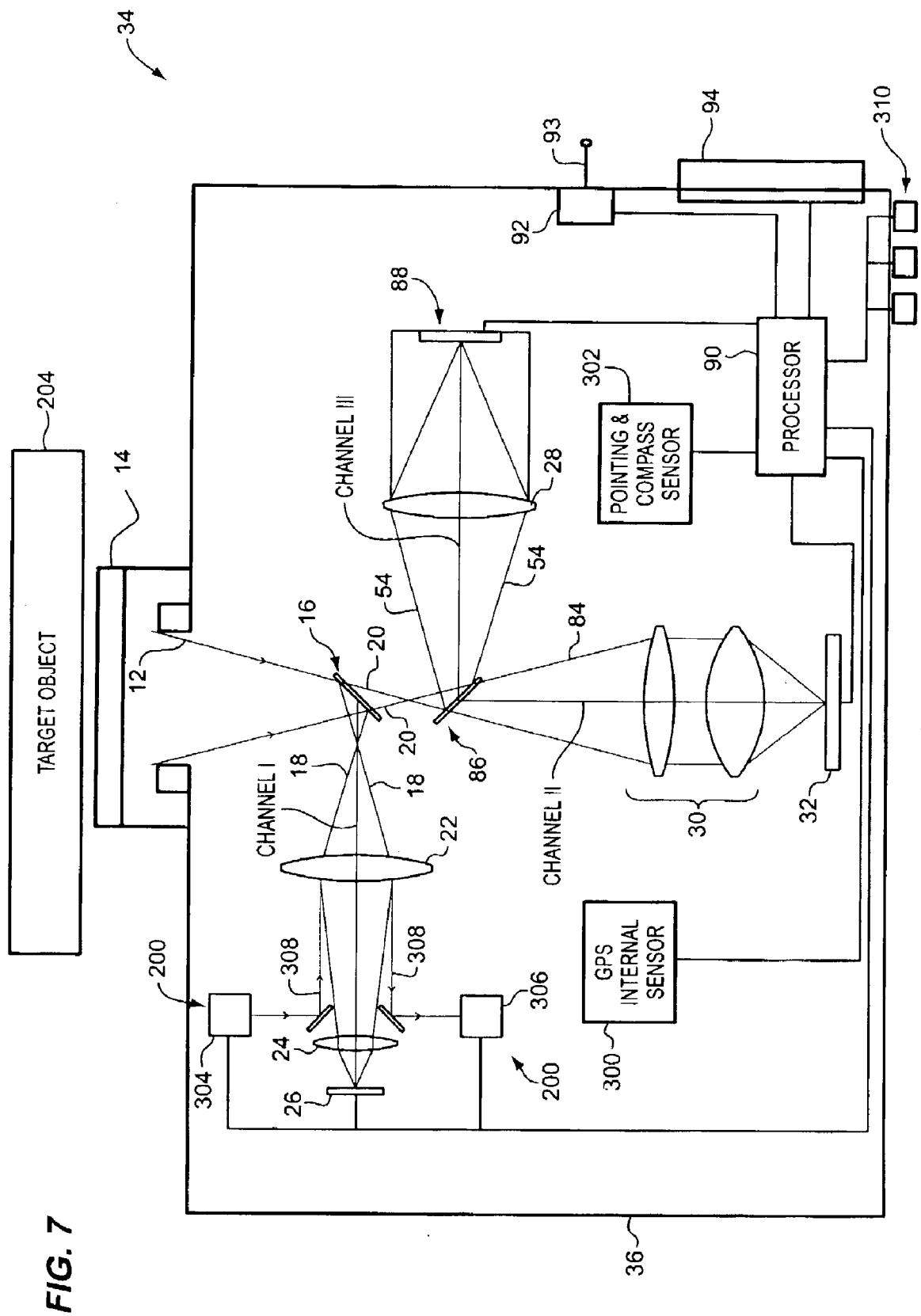
FIG. 7 is schematic illustration of another multi-mode optical imager and imaging module having MWIR, LWIR and visible detectors, and a distance finder.

FIG. 7 shows one embodiment of imaging module 34 with a global positioning system ("GPS") 300 providing the operator with the location of the multi-mode optical imager 10 relative to the earth and the orientation of the field of view. Imaging module 34 may have the same fore-optics 14 attached thereto as the multi-mode optical imager 10 of FIG. 1. The direction of aim of fore-optics 14 of multi-mode optical imager 10 may be provided by orientation sensors, for example, a pointing and compass sensor 302; such orientation sensors may also include a magnetic compass, gyroscopic compass, multiple GPS receivers, angle sensors (e.g., inclinometer), attitude resolver, accelerometer or other inertial sensors with GPS 300, rate gyros or magnetometer. Distance finder 200 may also be coupled with GPS 300 to determine the location of a target object 204 cited with multi-mode optical imager 10.

Imaging module 34 is shown in FIG. 7 to have channel I along which visible light wavelength band 18 is aligned, channel II along which a long-wave infrared wavelength band 84 is aligned, and channel III along which midwave infrared wavelength band 54 is aligned. Electromagnetic radiation 12 is first split by beam splitter 16 into visible light wavelength band 18 and infrared wavelength band 20; infrared wavelength band 20 travels to a second beam splitter 86 dividing infrared wavelength band 20 into long-wave infrared wavelength band 84 and midwave infrared wavelength band 54. Distance finder 200, in the form of output and input laser rangers 304, 306 in FIG. 7, sends and receives, respectively, laser signals 308 partially along channel I with visible light wavelength band 18. Visible light wavelength band 18 encounters first field lens 22 and one or more zoom lenses 24 to focus a visible image of radiation onto first optical detector 26, in a similar fashion to multi-mode optical imager 10 of FIG. 1. Along channel III, midwave infrared wavelength band 54 travels through second lens 28, which focuses band 54 onto a MWIR detector array 88 (e.g., an InSb array) for detection thereof. A cold shield 56 extends between lens 28 and the MWIR detector array 88, as described in FIG. 2. In channel II, f-number reducer 30 reduces the f-number of the long-wave infrared wavelength band 84 to match the f-number of the second optical detector 32, such as uncooled microbolometer array 48. Output laser ranger 304, input laser ranger 306, first optical detector 26, MWIR detector array 88 and uncooled microbolometer array 48 may all couple with a controller or processor 90, as shown. Processor 90 may perform post-processing on images detected by first optical detector 26, second optical detector 32, and MWIR detector array 88 for display for a user on a display screen 94 coupled with processor 90. Processor 90 may also process data from output laser ranger 304, and input laser ranger 306, and utilize (a) a GPS determined location of imaging module 34 relative to the earth, and (b) sensed data from orientation sensors (e.g., pointing and compass sensor 302) to determine the location of target object 204. A wireless transmitter 92 and antenna 93 may couple with processor 90 to transmit captured image data, distance from target object data, GPS location of imaging module 34, and/or location of target object 204, to remote receivers, such as an intelligence command center at a military base.

Because orientation sensors (e.g., pointing and compass sensor 302) provide the angular orientation of multi-mode optical imager 10 aimed at target object 204, and distance finder 200 provides the distance measured by distance finder 200 to target object 204, the position of target object 204 relative to multi-mode optical imager 10 is determined. This relative position information is then added to the position of the multi-mode optical imager 10 as determined by GPS 300 relative to the earth, to position target object 204 at an absolute location on earth. Alternatively, GPS 300 may be programmed to further determine the position of multi-mode optical imager 10 relative to another coordinate system formed on a map, such as a map of a country or a portion thereof. In this way, target object 204, through distance finder 200 and GPS 300, may be positioned relative to the coordinate system of the map. Further, the map may be formed on display screen 94 for viewing thereof by a user of imaging module 34. Multiple display screens 94 may be provided with imaging module 34 in FIG. 7, one display screen for each still image or video stream detected by each of first optical detector 26, second optical detector 32, and MWIR detector array 88. Alternatively, video streams detected by detectors 36, 32, 88, may be merged for display on a single display screen 94, in accord with the following examples: (1) the detected visible light wavelength band 18 video stream is multiplied by the detected midwave infrared wavelength band 54 video stream and detected long-wave infrared wavelength band 84 video stream; (2) the video streams are overlayed; and (3) the midwave infrared wavelength band 54 video stream and long-wave infrared wavelength band 84 video stream are processed by processor 90 to derive the outlines of target object 204, while visible light wavelength band 18 video stream provides the visible image of target object 204.

Multi-mode optical imager 10 of FIG. 7 may also have input buttons 310 on housing 30 of imaging module 34, similar to input buttons 214 of FIG. 6, to provide an input means for a user to select a distance request to a sighted target object 204 by distance finder 200, to initiate a GPS determination, and/or to select a map for display on display screen 94. Processor 90 may also receive the user selections from input buttons 214 and generate command signals communicated to distance finder 200 and GPS 300 for operation thereof based on the user input. The input commands described above may also be input by remote control (e.g., radio control).

Figure 8:
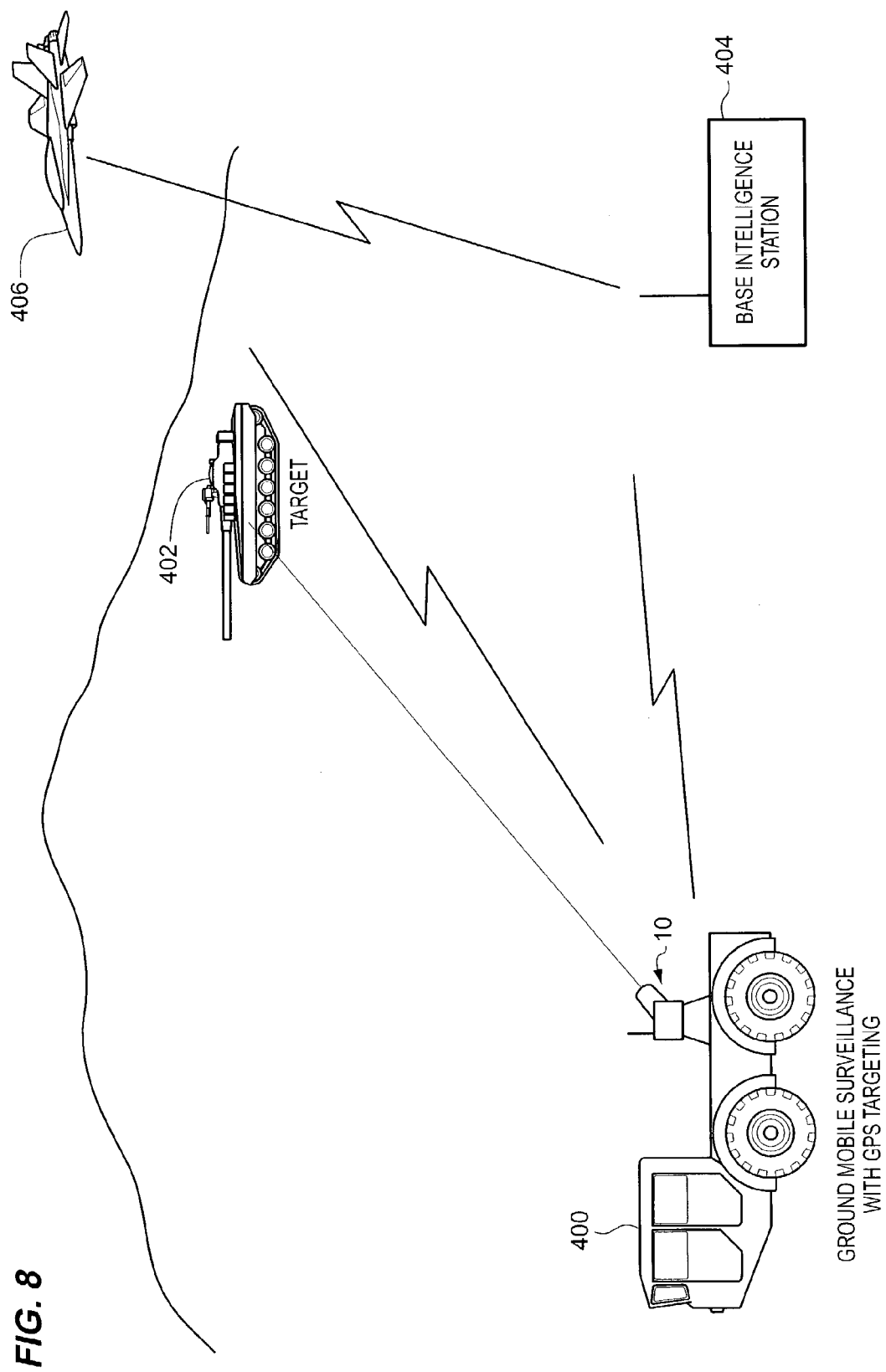
FIG. 8 shows another multi-mode optical imager in use with a ground mobile surveillance vehicle.

FIG. 8 shows multi-mode optical imager 10 in use with an imaging module such as imaging module 34 of FIG. 7. Multi-mode optical imager 10, FIG. 8, is mounted onto a ground mobile surveillance vehicle 400, such as a military truck. Electromagnetic radiation 12 emitted from, and/or reflected off of, a target object 402 is first detected by multi-mode optical imager 10. The target object 402 is then analyzed through one or a plurality of channels I, II, III, to process the image. One of the channels (e.g., channel I) may alternatively include hyperspectral capability as in FIG. 5. The analyzed target object may thus identify, for example, a particular structure such as a missile launcher within target object 402. By way of example, multi-mode optical imager 10, FIG. 8, of one embodiment includes post-processor 78 of FIG. 5; post-processor 78 is programmed with ATR to identify the structure of target object 402 within a video stream and to process a still image of hyperspectral array 66 and/or second optical detector 32 of target object 402. The still image of target object 402 may additionally be transmitted by a transmitter (e.g., transmitter 92, FIG. 7) to a base intelligence station 404.

In another example, a GPS determination is made by GPS 300 for multi-mode optical imager 10, FIG. 8. Approximately simultaneously with the GPS determination, or immediately thereafter, distance finder 200 determines the distance to target object 402. Knowing the orientation of multi-mode optical imager 10 in 3-dimensional space, determined by orientation sensors (e.g., pointing and compass sensor 302) and inertial sensors with GPS 300, and the distance to target object 402, the absolute location of target object 402 relative to the earth is determined. This information may then be relayed by a user of multi-mode optical imager 10, or by a transmitter provided with optical imager 10 (e.g., wireless transmitter 92), to base intelligence station 404; base intelligence station 404 may then examine one or more images of target object 402 to determine if such object should be investigated and/or attacked. Alternatively, the absolute location of target object 402 may be transmitted from multi-mode optical imager 10 directly to an aerial vehicle (e.g., a fighter plane 406) that may investigate target object 402 and/or launch an attack on target object 402 at the known location thereof.

Figure 9:
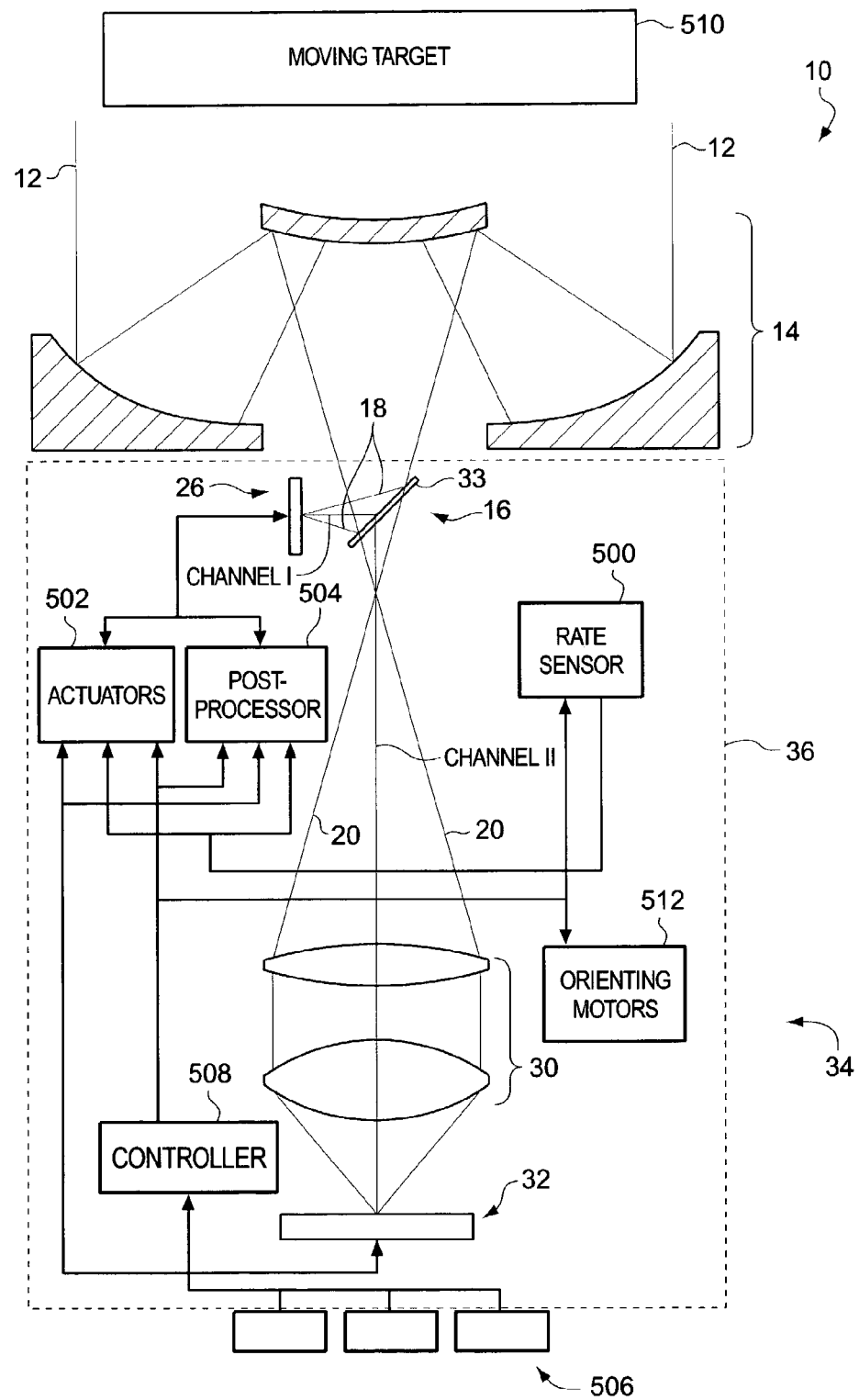
FIG. 9 is a schematic illustration of another multi-mode optical imager having rate sensors.

In FIG. 9, multi-mode optical imager 10 is shown with one or more rate sensors 500 for providing image stabilization. Rate sensors 500 measure the rate of change of movement or rotation of multi-mode optical imager 10. Data gathered by rate sensors 500 may be used to mechanically stabilize the image by various means, such as actuators 502; actuators 502, in communication with rate sensors 500 and first and second optical detectors 26, 32, may control small motors (not shown) that move optics internal of imaging module 34 or first and second optical detectors 26, 32, to maintain a steady image captured by detectors 26, 32. Rate sensors 500 may also communicate with a post processor 504. Post processor 504 receives the captured images from first optical detector 26 and second optical detector 32, and with the data received from rate sensors 500, determines how the captured images should be adjusted to account for motion instability. A button interface 506, similar to button interface 214 of FIG. 6, provides an input mechanism for a user to select image stabilization functions. Likewise, a controller 508, similar to controller 216 of FIG. 6, receives the user selections from button interface 506 and generates command signals communicated to rate sensors 500, actuators 502 and post-processor 504 for operation thereof based on the user input. Controller 508 may also, while directing image stabilization by actuators 502 and/or post processor 504, direct the aiming of multi-mode optical imager 10 at a moving target 510. Orienting motors 512 may be controlled by controller 508 and coupled with housing 36 to move multi-mode optical imager 10 such that fore-optics 14 are constantly aimed at moving target 510. It is to be understood that post-processor 504 may be incorporated into controller 508 as a matter of design choice.

Figure 10:
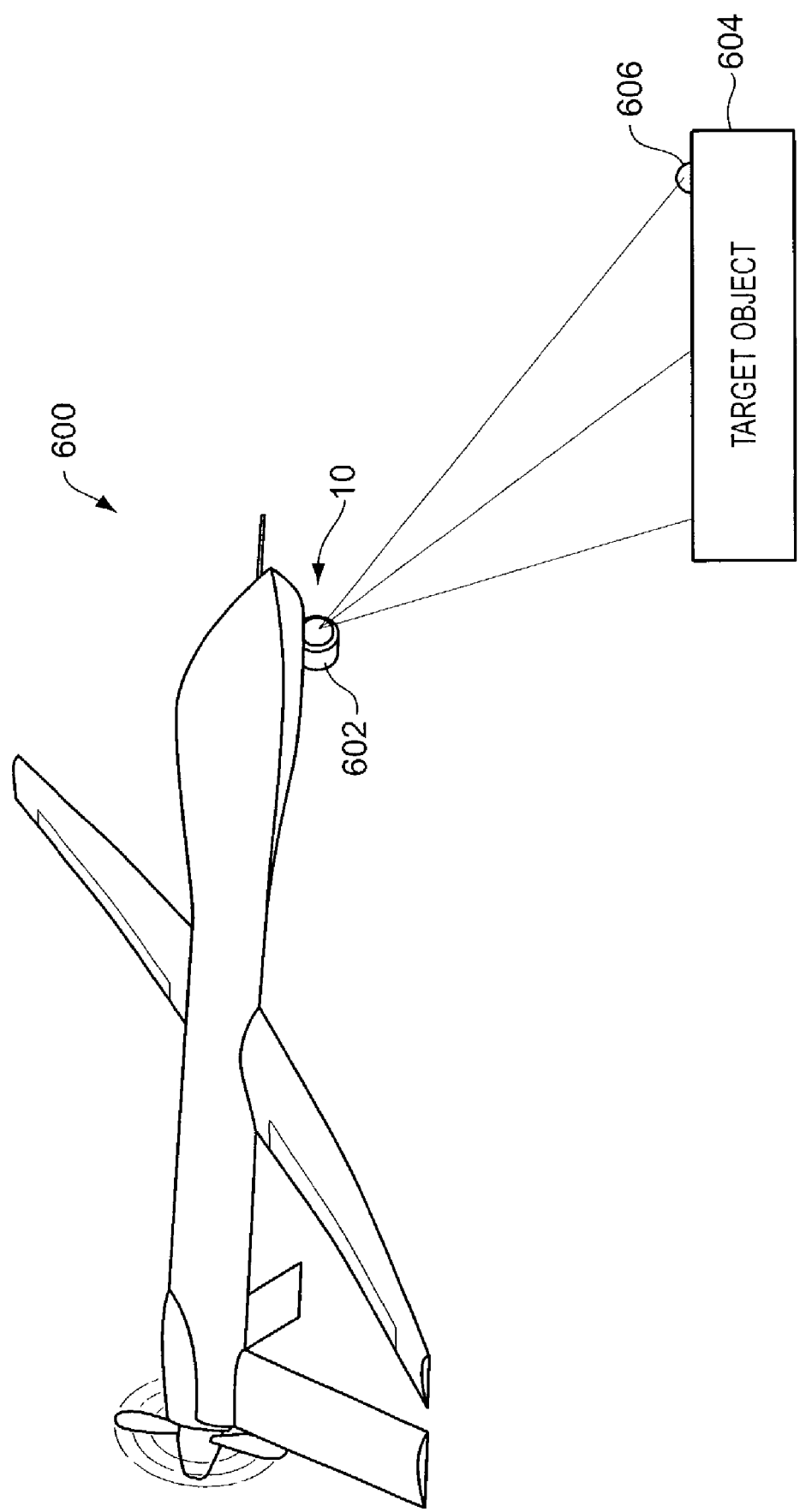
FIG. 10 shows another multi-mode optical imager in use with an unmanned aerial vehicle.

FIG. 10 shows another use of multi-mode optical imager 10 with an unmanned aerial vehicle (UAV) 600, such as for military reconnaissance. Multi-mode optical imager 10 is encased in housing 602 and may include, for example, fore-optics 14 and imaging module 34 of FIG. 1; it may additionally include distance finder 200 and targeting laser 202 of FIG. 6, and/or GPS 300 of FIG. 7, for example. A target object 604 may be imaged by multi-mode optical imager 10 into two or more different electromagnetic radiation wavelength bands, such as visible light wavelength band 18 and infrared wavelength band 20 of FIG. 1, to determine certain characteristics about the target object 604 (e.g., object dimensions, thermal energy radiated, etc.). The distance from multi-mode optical imager 10 to target object 604 may be determined by distance finder 200, and in conjunction with GPS 300, the actual position of target object 604 on earth is determined. Targeting laser 202 may also be used to place a marker 606 on target object 604, so that target object 604 may be identified by other systems for further imaging and/or to guide a projectile (e.g., an armed missile) to target object 604.

Another use of multi-mode optical imager 10 is for terminal guidance of missiles. Either transmitting images to ground operators for remote controlled target selection or with onboard automatic target recognition processor for target identification, selection and guidance. The multi-band nature of imager 10 provides the advantage of excellent visible images and/or hyperspectral images for accurate target detection during the day, infrared images for night operations and MMW sensing for foul weather operation.

Figure 11:
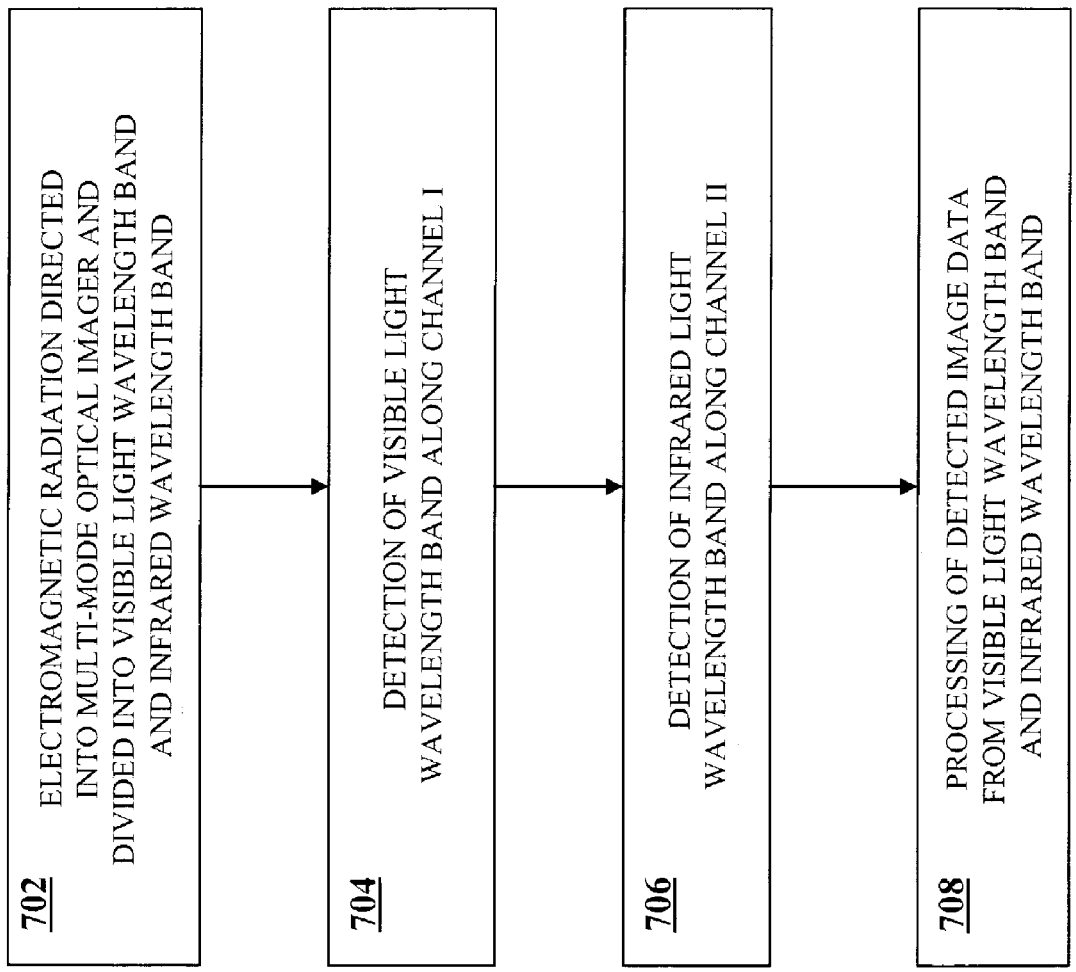
FIG. 11 shows a process for imaging with one multi-mode optical imager.

FIG. 11 shows a process 700 for imaging visible light wavelength band 18 and infrared wavelength band 20 with multi-mode optical imager 10. Process 700 for example includes certain software functions and/or routines controlling a multi-mode optical imager, such as image capture, shuttering, data synthesis and/or image processing to facilitate each described step. At step 702, fore-optics 14 magnify and direct incident electromagnetic radiation 12 from an object into common aperture 15 and to beam-splitter 16, which divides electromagnetic radiation into visible light wavelength band 18 and infrared wavelength band 20. First field lens 22 and zoom lens 24 then magnify and focus visible light wavelength band 18 along Channel I onto first optical detector 26 for detection thereof, at step 704. Likewise, second lens 28 and f-number reducer 30 focus infrared wavelength band 20 along Channel II and match the f-number of infrared wavelength band 20 to the f-number required by second optical detector 32 for detection thereof, at step 706. At step 708, post-processor processes the detected image data from visible light wavelength band 18 and infrared wavelength band 20 to, for example, display visible light and/or infrared image data on a display screen, and/or to analyze certain imaging characteristics of the object.

Figure 12:
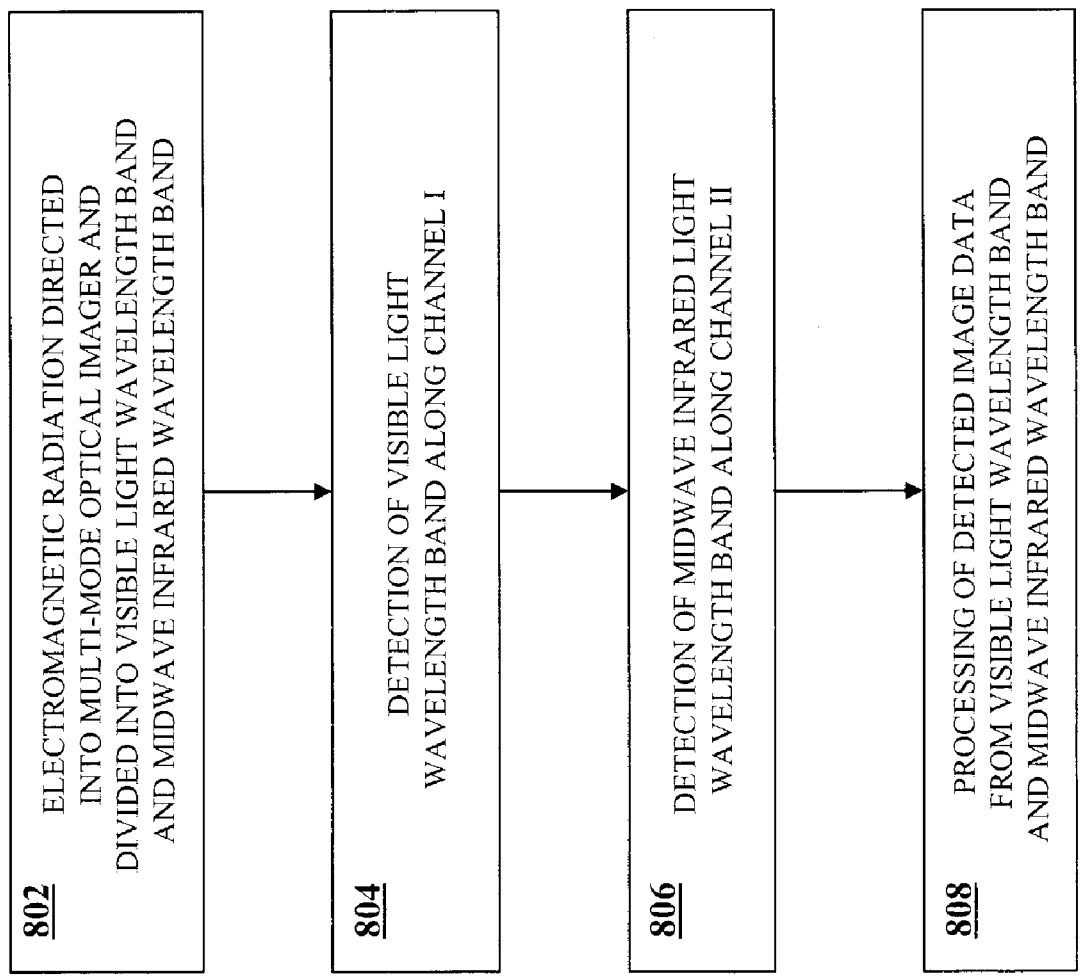
FIG. 12 shows another process for imaging with another multi-mode optical imager.

Another process 800 for imaging with multi-mode optical imager 10 is shown in FIG. 12 for detection of visible light wavelength band 18 and midwave infrared wavelength band 54. Process 800 for example includes certain software functions and/or routines controlling a multi-mode optical imager, such as image capture, shuttering, data synthesis and/or image processing to facilitate each described step. At step 802, fore-optics 14 magnify and direct incident electromagnetic radiation 12 from an object into common aperture 15 and to beam-splitter 16, which divides electromagnetic radiation into visible light wavelength band 18 and midwave infrared wavelength band 54. First optical detector 26 receives visible light wavelength band 18 along Channel I for detection thereof, at step 804. Midwave infrared wavelength band 54 travels along Channel II and is focused by second lens 28 onto second optical detector 32 for detection thereof, at step 806. At step 808, post-processor 52 processes the detected image data from visible light wavelength band 18 and midwave infrared wavelength band 54 to, for example, display visible light and/or midwave infrared image data on a display screen, and/or to analyze certain imaging characteristics of the object.

Those skilled in the art appreciate that process 700 and 800 of FIG. 11 and FIG. 12, respectively, may be combined within common software functionality to accommodate, for example, "swap out" of the MWIR channel (of process 800) with a LWIR channel (of process 700), and that processing steps may be physically separated from the detection steps by telemetry (e.g., radio link).

Figure 13:
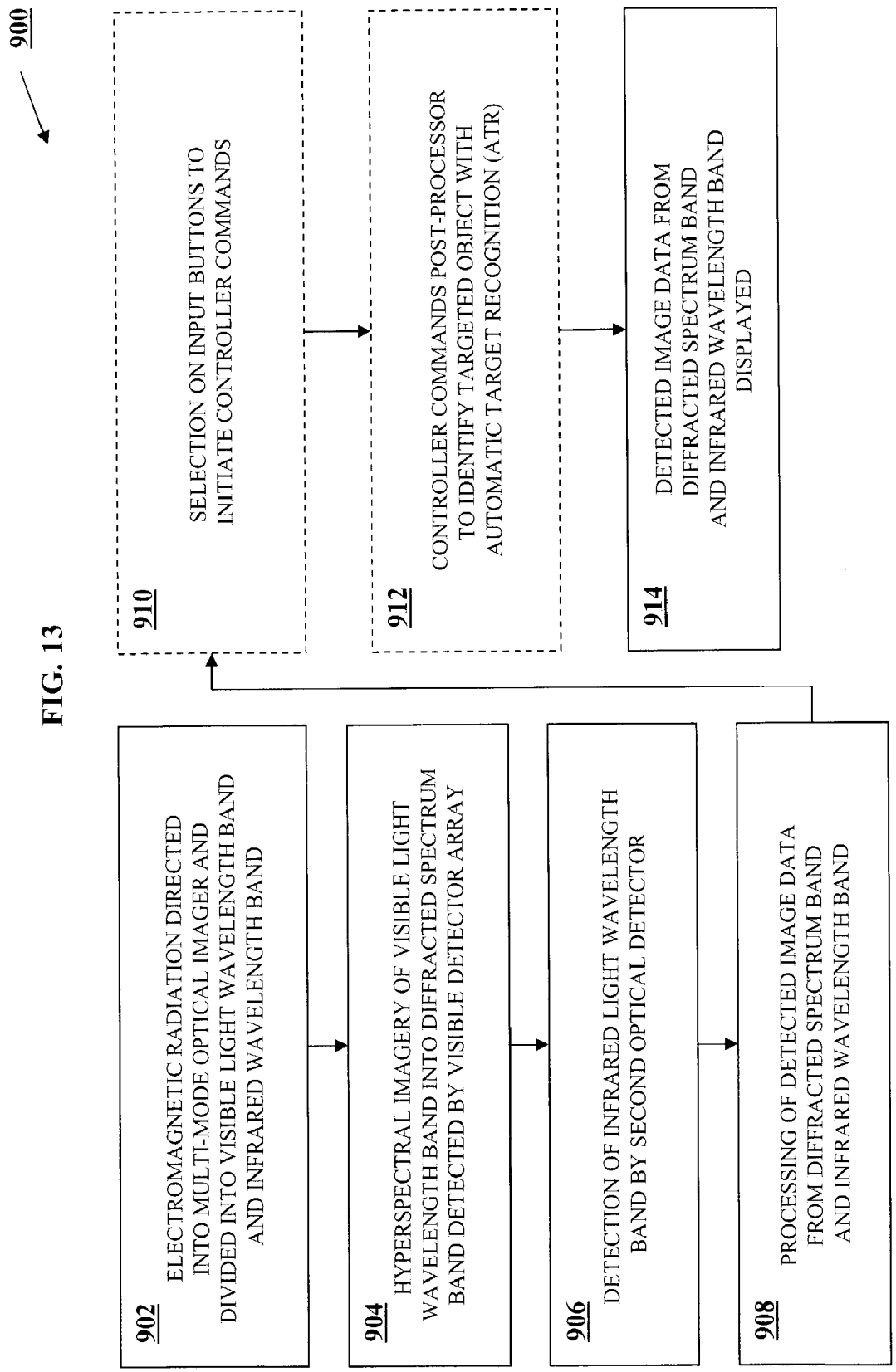
FIG. 13 shows another process for imaging with another multi-mode optical imager.

FIG. 13 shows another process 900 for imaging visible light wavelength band 18 and infrared wavelength band 20 with multi-mode optical imager 10 for enhanced imaging of an object. Process 900 for example includes certain software functions and/or routines controlling a multi-mode optical imager, such as image capture, shuttering, data synthesis and/or image processing to facilitate each described step. At step 902, fore-optics 14 magnify and direct incident electromagnetic radiation 12 from an object into common aperture 15 and to beam-splitter 16, which divides electromagnetic radiation 12 into visible light wavelength band 18 and infrared wavelength band 20. Hyperspectral imager 66 collimates visible light wavelength band 18, separates band 18 into various wavelengths of radiation within the visible spectrum with dispersing element 72 (e.g., a prism or a grating) to form diffracted spectrum band 68, and focuses diffracted spectrum band 68 onto visible detector array 76 for detection thereof, at step 904. Infrared wavelength band 20 reaches f-number reducer 30, which focuses infrared wavelength band 20 onto second optical detector 32 for detection thereof and matches the f-number of infrared wavelength band 20 with the f-number of detector 32, in step 906. At step 908, post-processor processes the detected image data from diffracted spectrum band 68 and infrared wavelength band 20. Processing step 908 may include, for example, analyzing the particular visible wavelengths detected in diffracted spectrum band 68 to determine the chemical composition of an imaged object, analyzing the infrared wavelength band 20 detected to determine the type of imaged object based on a heat signature (e.g., a tank, missile launcher, etc.). Optionally, at step 910, a user may make selections on input buttons 80 to initiate commands for controller 82 to direct processing by post-processor 78. For example, at step 912, controller 82 commands post-processor 78 to identify a certain targeted object with automatic target recognition (ATR) based on the detected visible spectrum bands within diffracted spectrum band 68. At step 914, the detected image data from diffracted spectrum band 68 and infrared wavelength band 20 are displayed on a display screen (e.g., display screen 156, FIG. 4).

Figure 14:
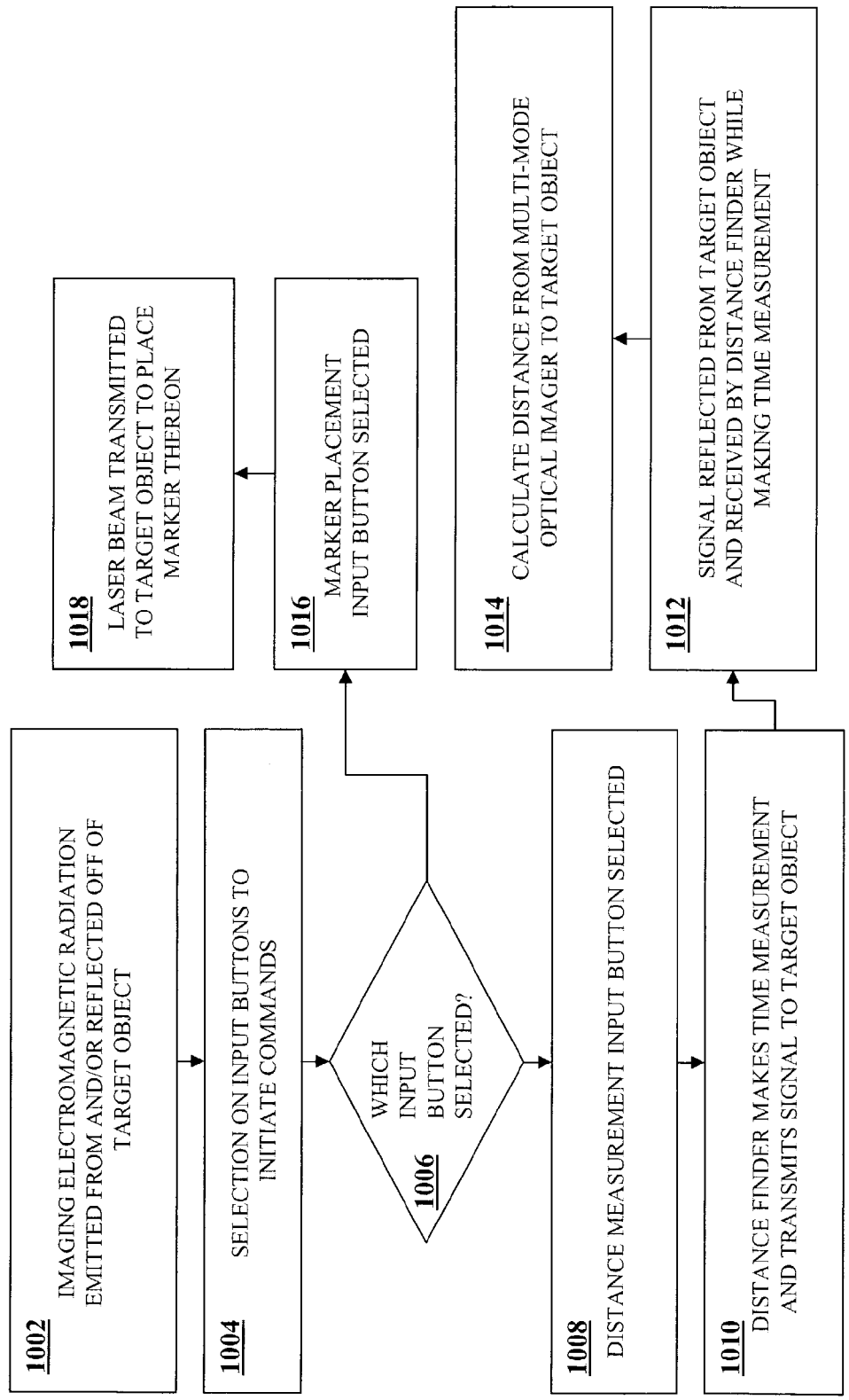
FIG. 14 shows a process for distance measurement and target marking with another multi-mode optical imager.

Another process 1000 is shown in FIG. 14 for determination of distance from multi-mode optical imager 10 to a target object 204, and to place marker 210 on the target object 204. Process 1000 for example includes certain software functions and/or routines controlling a multi-mode optical imager, such as image capture, shuttering, data synthesis and/or image processing to facilitate each described step. At step 1002, a user will first aim multi-mode optical imager 10, more specifically fore-optics 14, at an object for distance measurement from optical imager 10 and/or targeting of the object (i.e., target object 204); step 1002 may consist of imaging electromagnetic radiation 12 emitted from, and/or reflected off of, target object 204, such as by one of processes 700 of FIG. 11, 800 of FIG. 12, or 900 of FIG. 13. A user will initiate a command by selecting one or more input buttons 214, at step 1004. A determination is then made by controller 216, at step 1006, as to what input button 214 has been selected. If an input button 214 associated with measurement of the distance from multi-mode optical imager 10 to target object 204 is selected, at step 1008, then distance finder 200, at step 1010, makes a time measurement and simultaneously transmits a signal 206 reflecting off of reflector 212 and fore-optics 14 to travel to target object 204. At step 1012, signal 206 is reflected back off of target object 204 and is received by fore-optics 14 and reflected off of reflector 212 for reception by distance finder 200 while simultaneously noting the time of reception. Then, at step 1014, a calculation is made, based on the elapsed time, of the distance to target object 204. Returning to step 1006, if an input button 214 associated with placing of marker 210 on target object 204 is selected, at step 1016, then targeting laser 202, at step 1018, transmits a laser beam 208 reflecting off of reflector 212 and fore-optics 14 to travel to target object 204 and place marker 210 thereon.

Figure 15A:
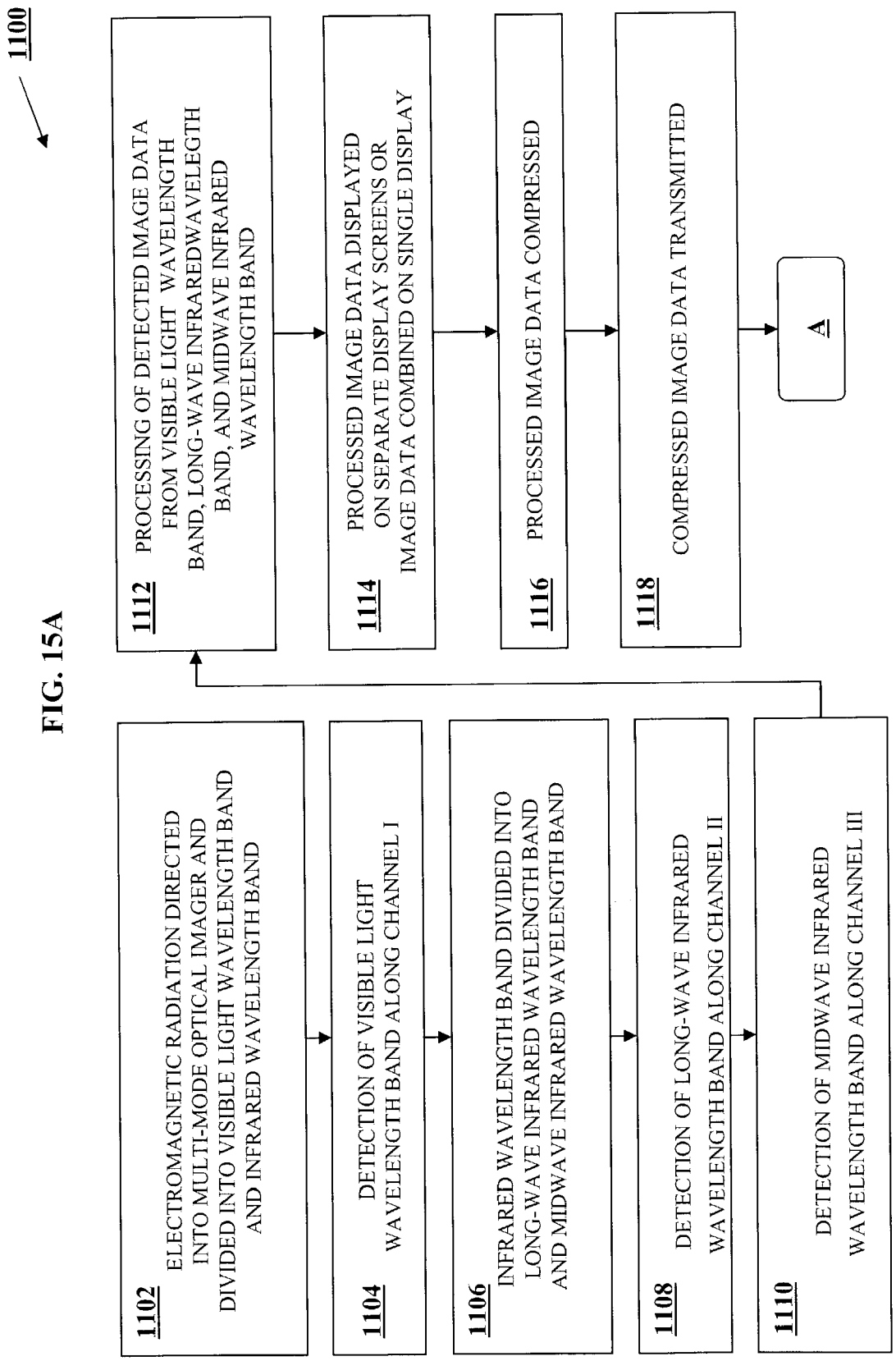
FIG. 15A shows another process for imaging with another multi-mode optical imager.

FIGS. 15A and 15B show another process 1100 for multiple bandwidth imaging with imaging module 34. Process 1100 for example includes certain software functions and/or routines controlling a multi-mode optical imager, such as image capture, shuttering, data synthesis and/or image processing to facilitate each described step. At step 1102, electromagnetic radiation 12 entering imaging module 34 from, for example, fore-optics 14, is directed to beam-splitter 16, which divides electromagnetic radiation 12 into visible light wavelength band 18 and infrared wavelength band 20. First field lens 22 and zoom lens 24 then magnify and focus visible light wavelength band 18 along Channel I onto first optical detector 26 for detection thereof, at step 1104. Infrared wavelength band 20 then encounters second beam splitter 86, at step 1106, splitting band 20 into long-wave infrared wavelength band 84 and midwave infrared wavelength band 54. At step 1108, long-wave infrared wavelength band 84 travels along Channel II and reaches f-number reducer 30, which focuses band 84 onto second optical detector 32 (i.e., uncooled microbolometer array 48) for detection thereof and matches the f-number of band 84 to the f-number of second optical detector 32. At step 1110, midwave infrared wavelength band 54 travels along Channel III and is focused by second lens 28 onto MWIR detector array 88 for detection thereof. Processor 90 may perform post-processing on image data detected by first optical detector 26, second optical detector 32, and MWIR detector array 88, at step 1112. Post-processed image data detected by first optical detector 26, second optical detector 32, and MWIR detector array 88, may each be displayed on a separate display screens 94, or the image data may be combined for display on a single display screen 94, at step 1114; such post-processed image data may also be compressed using computer data compression techniques, in step 1116, and transmitted by transmitter 92 to a location remote from imaging module 34 (e.g., intelligence command center), in step 1118.

Process 1100 may be continued, as shown in FIG. 15B, if it is desired to determine the location of target object 204 imaged by first optical detector 26, second optical detector 32, and MWIR detector array 88. At step 1120, a user will initiate a command by selecting one or more input buttons 310. Processor 90 will then determine, at step 1122, based on the selected input buttons 214, if a measurement of the distance from imaging module 34 to target object 204 with distance finder 200 is desired, a position of imaging module 34 relative to the earth with GPS 300 is desired, or whether a position of target object 204 relative to imaging module 34 and/or the earth is desired. If a measurement of the distance from imaging module 34 to target object 204 with distance finder 200 is selected, then, at step 1124, output laser ranger 304 of distance finder 200 makes a time measurement (i.e., time of transmission) and simultaneously transmit a signal 308 reflecting off of a reflector and travel along Channel I, then reflecting off of beam-splitter 16 and, optionally, fore-optics 14 to travel to target object 204. At step 1126, signal 308 is reflected back off of target object 204 and is received by, optionally, fore-optics 14, reflected off of beam-splitter 16 along Channel I and off of a reflector for reception by laser ranger input 306 and a time of reception noted. Then, at step 1128, a calculation is made, based on the time registered by the output laser ranger 304 and input laser ranger 306, that determines the distance to target object 204.

Returning to step 1122, if alternatively, it is determined that the position of imaging module 34 with GPS 300 is selected, then, at step 1130, GPS 300 receives a signal from a satellite network to determine the location of imaging module 34 relative to the earth.

Returning to step 1122, if alternatively, it is determined that the position of target object 204 relative to imaging module 34 and/or the earth is selected, then at step 1132, GPS 300 receives a signal from a satellite network to determine the location of imaging module 34 relative to the earth approximately simultaneously with distance finder 200 performing steps 1124 through 1128, and with one or more orientation sensors (e.g., pointing and compass sensor 302 or inertial sensors with GPS 300) determining the angular orientation of imaging module 34 and attached fore-optics 14. Then, at step 1134, the relative position of target object 204 to imaging module 34 is calculated from the distance determined by distance finder 200 and the angular orientation in three-dimensional space determined by the one or more orientation sensors. At step 1136, the relative position of target object 204 is then added to the position of imaging module 204 relative to the earth with GPS to calculate the position of target object 204 relative to earth.

At step 1138, any of values determined in steps 1128, 1130, 1134 and/or 1136 representative of the distance from imaging module 34 to target object 204, position of imaging module 34 relative to the earth, and/or position of target object 204 relative to imaging module 34 and/or the earth, respectively, may be displayed on display screen 94 for a user. Optionally, at step 1140, an electronic map display may be placed on display screen and any of such values determined in steps 1128, 1130, 1134 and/or 1136 may be displayed on the map such that the position of imaging module 34 and/or target object relative to a coordinate system of the map may be determined.

At step 1142, such values determined in steps 1128, 1130, 1134 and/or 1136 may be transmitted by transmitter 92 through antenna 93 to a location remote from imaging module 34.

Figure 16:
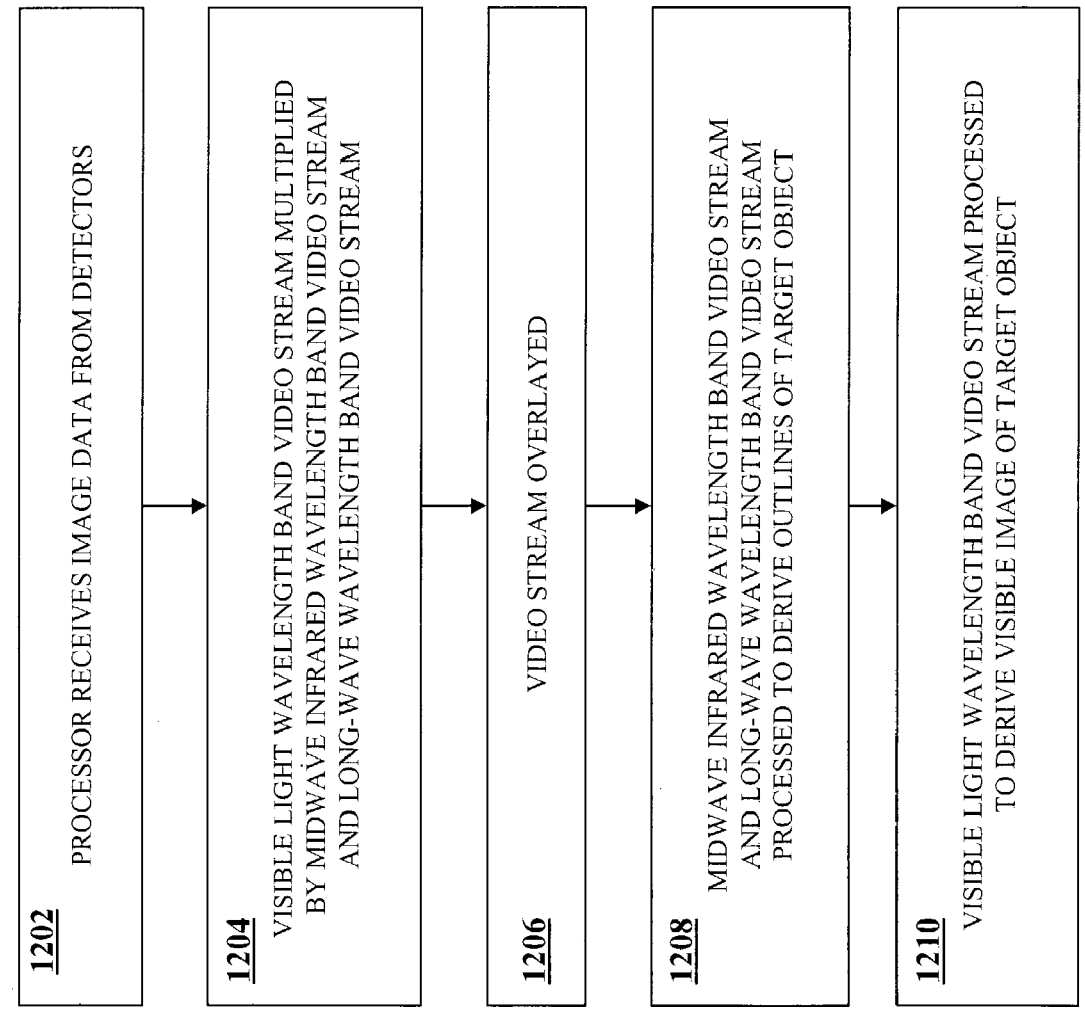
FIG. 16 shows a process for merging image data on a display.

FIG. 16 shows another process 1200 for merging image data detected by first optical detector 26, second optical detector 32, and MWIR detector array 88 as video streams into a single display on, for example, display screen 94. Process 1200 for example includes certain software functions and/or routines controlling a multi-mode optical imager, such as image capture, shuttering, data synthesis and/or image processing to facilitate each described step. At step 1202, processor 90 receives the detected image data from detectors 26, 32 and 88. At step 1204, visible light wavelength band 18 video stream is multiplied by the midwave infrared wavelength band 54 video stream and long-wave infrared wavelength band 84 video stream. At step 1206, the video streams of bands 18, 54 and 84 are overlayed. At step 1208, midwave infrared wavelength band 54 video stream and long-wave infrared wavelength band 84 video stream are processed by processor 90 to derive the outlines of target object 204. Finally, at step 1210, visible light wavelength band 18 video stream is processed by processor 90 to derive the visible image of target object 204.

Figure 17:
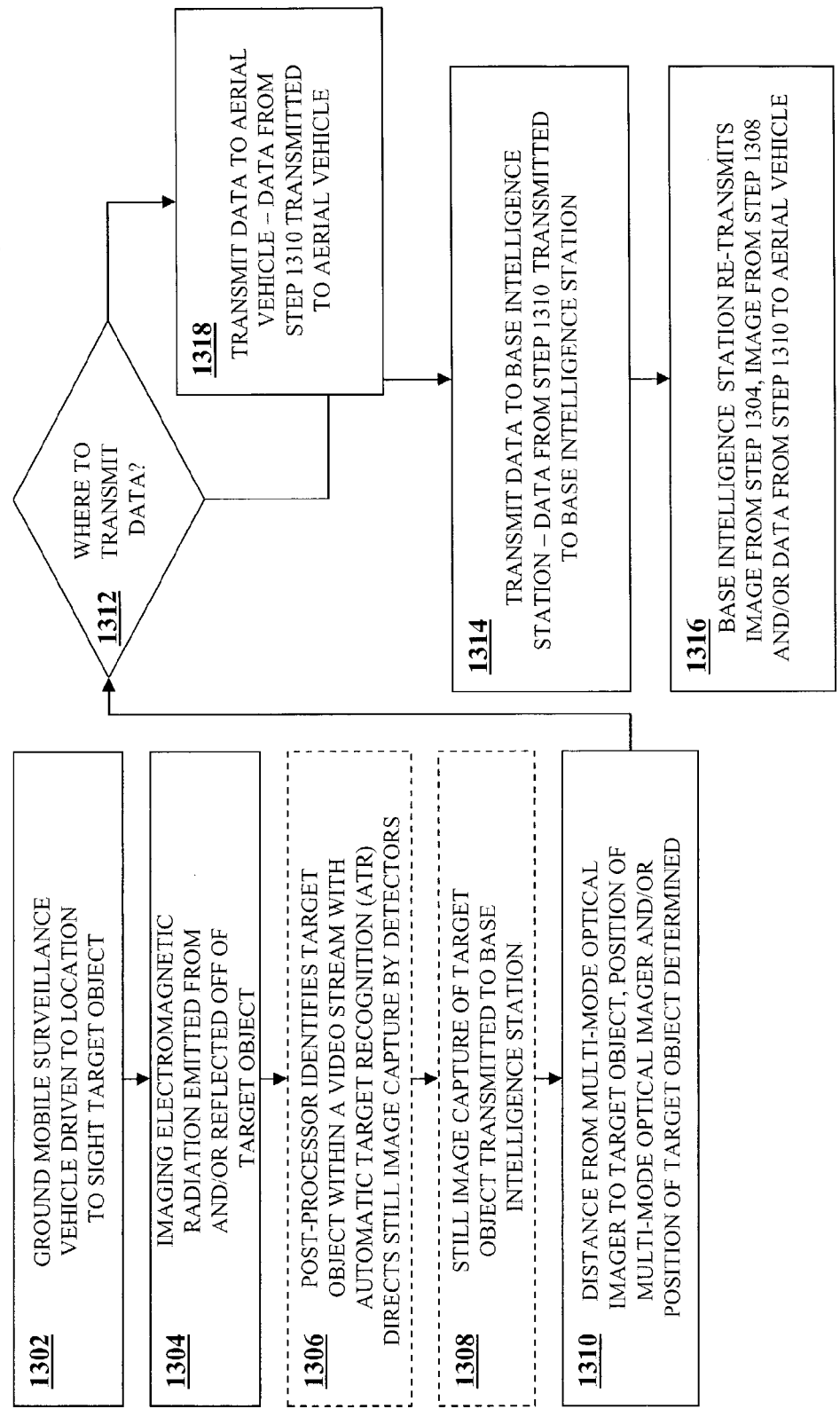
FIG. 17 shows a process for surveillance and targeting of a target object with another multi-mode optical imager on a ground mobile surveillance vehicle.

Another process 1300 is provided for surveillance and targeting of a target object 402, as shown in FIG. 17. Process 1300 for example includes certain software functions and/or routines controlling a multi-mode optical imager, such as image capture, shuttering, data synthesis and/or image processing to facilitate each described step. At step 1302, ground mobile surveillance vehicle 400, having multi-mode optical imager 10 mounted thereon, is driven to a location to sight target object 402. At step 1304, target object 402 is sighted and the electromagnetic radiation 12 emitted from, and/or reflected off of, target object 402, is detected by, for example, one of processes 700 of FIG. 11, 800 of FIG. 12, 900 of FIG. 13, or 1100 of FIG. 15. Optionally, at step 1306, post-processor (e.g., post-processor 78, FIG. 5) may be pre-programmed with ATR to identify target object 402 within a video stream and direct a still image capture by, for example, first optical detector 26, second optical detector 32, hyperspectral array 66, and/or MWIR detector array 88. Further, as an optional step 1308, the still image captured of target object 402 is transmitted to base intelligence station 404. At step 1310, distance finder 200 and/or GPS 300 are used to determine distance from multi-mode optical imager 10 to target object 204, position of multi-mode optical imager 10 relative to the earth, and/or position of target object 204 relative to multi-mode optical imager 10 and/or the earth, in accord with process 1100. At step 1312, a determination is made as to whether multi-mode optical imager 10 will transmit data to base intelligence station 404 or to an aerial vehicle (e.g., fighter plane 406). If data is chosen for transmission to base intelligence station 404, then, at step 1314, the data from step 1310 may be transmitted to base intelligence station 404. At step 1316, base intelligence station 404 may re-transmit the image of target object 402 detected from step 1304, the still image captured of target object 402 from step 1308, and/or the data from step 1310 to an aerial vehicle. Returning to step 312, if data is chosen for transmission to aerial vehicle, then, at step 1318, the data from step 1310 may be transmitted to aerial vehicle (fighter plane 406) to investigate target object 402 and/or launch an attack on target object 402.

Figure 18:
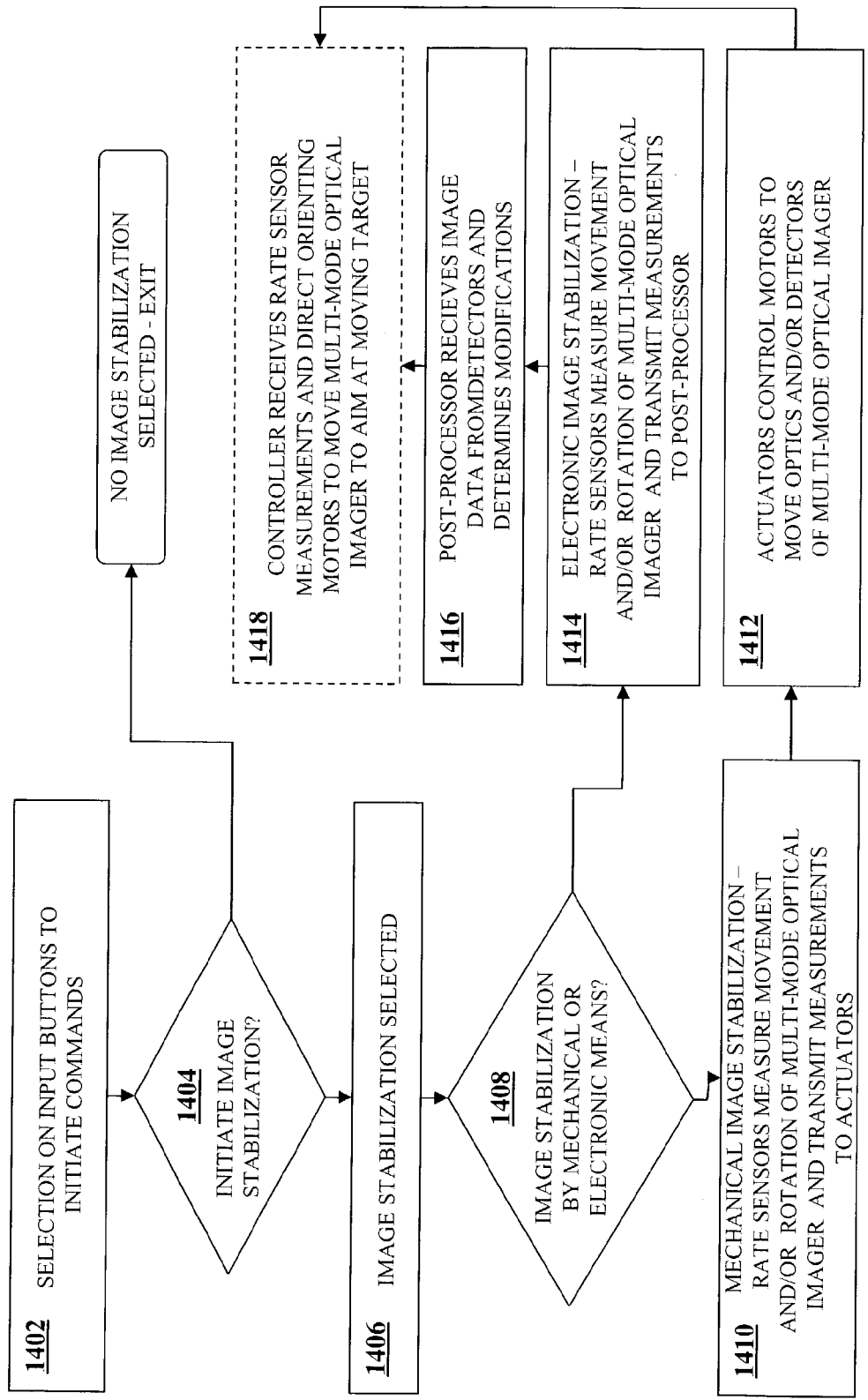
FIG. 18 shows a process for providing image stabilization to multi-mode optical imager.

FIG. 18 shows another process 1400 for providing image stabilization to multi-mode optical imager 10. Process 1400 for example includes certain software functions and/or routines controlling a multi-mode optical imager, such as image capture, shuttering, data synthesis and/or image processing to facilitate each described step. At step 1402, a user will initiate a command by selecting one or more input buttons 506. Controller 508 will then determine, at step 1404, based on the selected input buttons 506, whether to initiate stabilization of visible light wavelength band 18 image data detected by first optical detector 26 and infrared wavelength band 20 image data detected by second optical detector 32. If image stabilization is selected, at step 1406, controller 508, at step 1408, then determines if image stabilization is by mechanical means or by electronic means. If image stabilization is by mechanical means, then rate sensors 500, at step 1410, measures the rate of change of movement or rotation of the multi-mode optical imager 10 and transmits such measurements to actuators 502; actuators 502 then controls small motors, in step 1412, to move optics internal of multi-mode optical imager 10 and/or first and second optical detectors 26, 32 to counteract the movement of multi-mode optical imager 10. Returning to step 1406, if image stabilization is by electronic means, then rate sensors 500 will measure the rate of change of movement or rotation of the multi-mode optical imager 10 and transmit such measurements to post-processor 504, in step 1414; post-processor 504, at step 1416, then receives visible light wavelength band 18 image data and infrared wavelength band 20 image data from detectors 26, 32, respectively, and determines modifications to the image data to counteract the movement of multi-mode optical imager 10. Optionally, at step 1418, controller 508 receives the rate of change of movement or rotation of the multi-mode optical imager 10 data from rate sensors 500 and directs the operation of orienting motors 512 to move multi-mode optical imager 10 such that fore-optics 14 are constantly aimed at moving target 510. If image stabilization is not selected, in step 1404, the process 1400 is exited.

Figure 19:
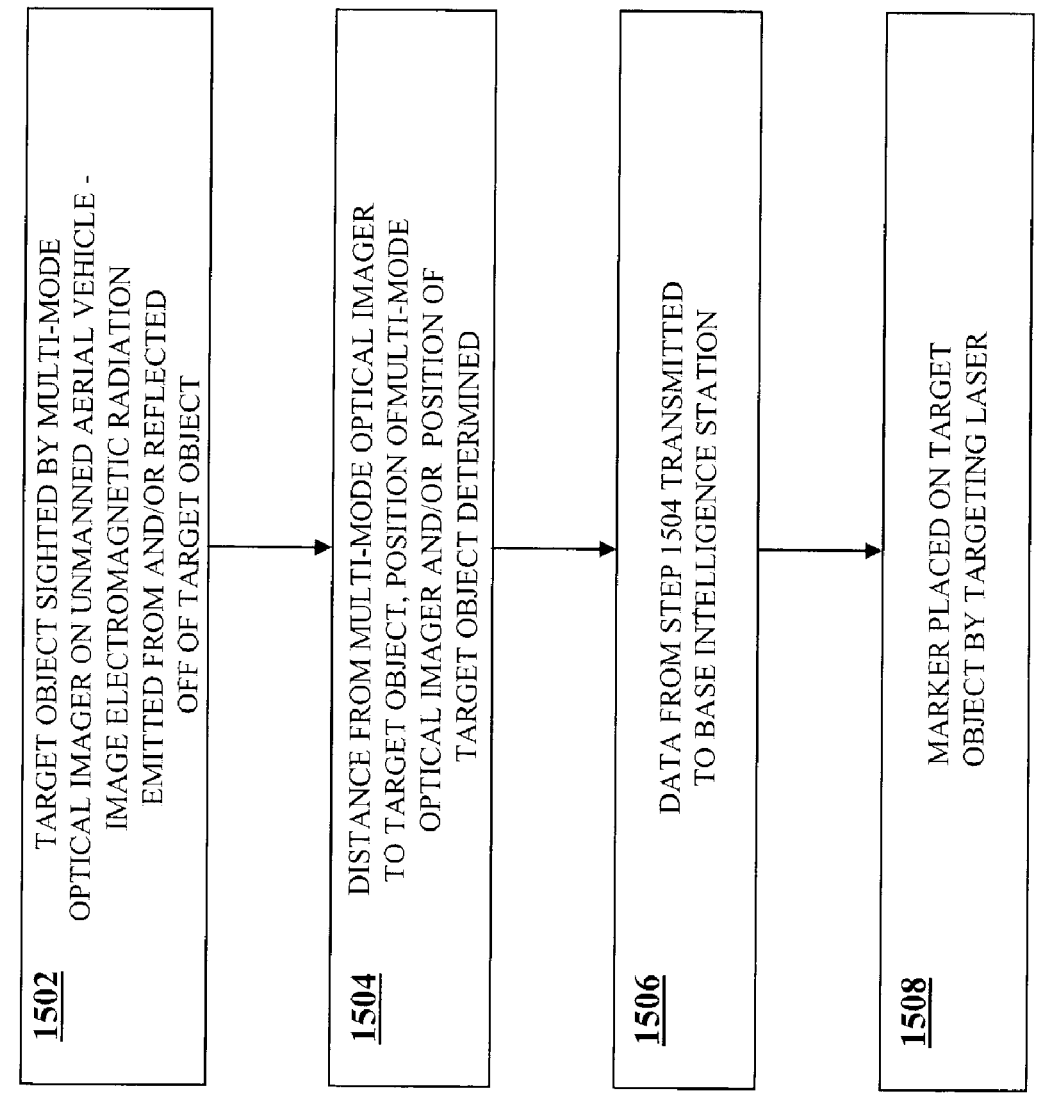
FIG. 19 shows another process for surveillance and targeting of a target object with another multi-mode optical imager on an unmanned aerial vehicle.

Another process 1500 is shown in FIG. 19 for imaging a target object 604 with an unmanned aerial vehicle (UAV) 600, such as for military reconnaissance. Process 1500 for example includes certain software functions and/or routines controlling a multi-mode optical imager, such as image capture, shuttering, data synthesis and/or image processing to facilitate each described step. At step 1502, target object 604 is sighted by multi-mode optical imager 10 and the electromagnetic radiation 12 emitted from, and/or reflected off of, target object 604, is detected by, for example, one of processes 700 of FIG. 11, 800 of FIG. 12, 900 of FIG. 13, or 1100 of FIG. 15. At step 1504, distance finder 200 and/or GPS 300 are used to determine distance from multi-mode optical imager 10 to target object 604, position of multi-mode optical imager 10 relative to the earth, and/or position of target object 604 relative to imaging module 34 and/or the earth, in accord with process 1100. At step 1506, the data from step 1504 may be transmitted to base intelligence station 404, FIG. 8, or other remote location. At step 1508, targeting laser 202 may place a marker 606 on target object 604.

Since certain changes may be made in the above methods and systems without departing from the scope hereof, it is intended that all matter contained in the above description or shown in the accompanying drawing be interpreted as illustrative and not in a limiting sense. It is also to be understood that the following claims are to cover certain generic and specific features described herein.

What is claimed is:

1. A common aperture multi-mode optical system, comprising:
    reflective first fore-optics for imaging electromagnetic radiation through a common aperture to an intermediate image plane;
    a first imaging module having
        (a) a first beam-splitter located after the common aperture, for dividing the electromagnetic radiation between a first wavelength band and one or more second wavelength bands,
        (b) a first detector for detecting the first wavelength band,
        (c) one or more second detectors for detecting the second wavelength bands; and
    an interface for attaching the first imaging module to the first fore-optics and alternatively detaching the first imaging module from the first fore-optics.

2. The system of claim 1, further comprising a second imaging module, the first imaging module being removable from the first fore-optics via the interface, the second imaging module being attachable to the first fore-optics via the interface, for providing imaging of one or more third wavelength bands.

3. The system of claim 2, the first wavelength band comprising visible light, the one or more second wavelength bands comprising long-wave infrared radiation, the one or more third wavelength bands comprising mid-wave infrared radiation.

4. The system of claim 1, further comprising second fore-optics, the first fore-optics module being removable from the first imaging module via the interface, the second fore-optics being attachable to the first imaging module via the interface, for providing different optical imaging of the electromagnetic radiation into the first imaging module.

5. The system of claim 1, wherein the beam-splitter is a dichroic beam-splitter.

6. The system of claim 1, wherein the first wavelength band is visible light electromagnetic radiation.

7. The system of claim 6, wherein the first detector comprises one of a CCD array or a CMOS array.

8. The system of claim 6, further comprising a field lens and one or more magnifying lenses positioned between the beam-splitter and the first detector, to provide for zooming in and out of the first wavelength band.

9. The system of claim 1, wherein the one or more second wavelength bands comprise a long-wave infrared band.

10. The system of claim 9, wherein the one or more second detectors comprise an uncooled microbolometer array.

11. The system of claim 10, further comprising micro-optics disposed proximal to the uncooled microbolometer array to reduce the f-number of the long-wave infrared band incident to the uncooled microbolometer array.

12. The system of claim 11, the micro-optics comprising a plurality of reflective concentrators, each of the concentrators being adjacent to one bolometer of the microbolometer array.

13. The system of claim 12, the concentrators comprising compound parabolic shapes.

14. The system of claim 12, the concentrators comprising one or more reflective elements transmissive to the long-wave infrared band, each of the elements being adjacent to one bolometer of the microbolometer array.

15. The system of claim 11, the micro-optics comprising one or more refractive elements transmissive to the long-wave infrared band, each of the elements being adjacent to one bolometer of the microbolometer array.

16. The system of claim 11, further comprising a piezo-electric element responsive to a command signal to displace the micro-optics further from, and alternatively closer to, the microbolometer array.

17. The system of claim 11, wherein the micro-optics comprise an array of hallow tapered capillaries.

18. The system of claim 1, wherein the one or more second wavelength bands comprises a mid-wave infrared band and a long-wave infrared band, and further comprising a second beam-splitter for dividing the one or more second wavelength bands between the mid-wave infrared band and the long-wave infrared band, the one or more second detectors comprising a first infrared detector and a second infrared detector.

19. The system of claim 18, the first infrared detector comprising a microbolometer array, the second infrared detector comprising a MWIR detector.

20. The system of claim 19, the MWIR detector comprising one of PtSi, InSb and HgCdTe.

21. The system of claim 1, wherein the first imaging module further comprises optics for reducing the f-number of at least one of the one or more second wavelength bands.

22. The system of claim 21, wherein the optics comprises one or more of a fiber optic taper, one or more refractive lens elements, and reflective elements.

23. The system of claim 1, further comprising one or more magnifying lenses positioned between the first beam-splitter and at least one of the one or more second detectors, to provide for zooming in and out of at least one of the one or more second wavelength bands.

24. The system of claim 1, further comprising a housing encasing at least the first imaging module, except for a region of the common aperture.

25. The system of claim 1, wherein the first fore-optics comprises a Cassegrain mirrored telescope.

26. The system of claim 1, wherein the first fore-optics comprises a Newtonian mirrored telescope.

27. The system of claim 1, wherein the first imaging module further comprises a first post processor coupled with the first detector and the one or more second detectors to process the first wavelength band and the one or more second wavelength bands to form an assembled image.

28. The system of claim 27, further comprising a second imaging module, the first imaging module being removable from the first fore-optics via the interface, the second imaging module being attachable to the first fore-optics via the interface, for providing imaging one or more third wavelength bands via one or more third detectors within the second imaging module, the second imaging module comprising a second post processor coupled with the third detectors for detecting the third wavelength bands, the second post-processor coupled with the third detectors to form an assembled image.

29. The system of claim 1, wherein the first imaging module further comprises a post processor coupled with the first detector and one or more second detectors to process the first wavelength band and the one or more second wavelength bands to automatically identify and detect target objects in the field of view of the system.

30. The system of claim 1, wherein the first imaging module further comprises a distance finder for transmitting a signal through the first fore-optics to determine a distance from the optical system to a target object.

31. The system of claim 1, wherein the first imaging module further comprises a targeting laser for transmitting a laser through the first fore-optics to a target object.

32. The system of claim 1, wherein the first imaging module further comprises a global positioning system for determining earth location of the optical system.

33. The system of claim 32, wherein the first imaging module further comprises a distance finder and one or more orientation sensors, to determine the location of a target object by determining:
  (a) the location of the optical system determined by the global positioning system;
  (b) a distance from the optical system to the target object determined by the distance finder; and
  (c) a direction the first fore-optics are aimed as determined by the one or more orientation sensors.

34. The system of claim 1, wherein the first imaging module further comprises one or more rate sensors to measure movement of the optical system for image stabilization.

35. The system of claim 1, further comprising a housing for encasing at least the first imaging module, except for a region of the common aperture, and wherein the first wavelength band comprises a first optical channel within the housing that is modularized to be mechanically swappable with another channel to provide one of (a) repair of the first channel and (b) imaging in another wavelength band.

36. The system of claim 35, wherein the first imaging module further comprises a first post processor coupled with the first detector and the one or more second detectors to process the first wavelength band and the one or more second wavelength bands to form an assembled image, the post-processor being configured to accommodate processing of the another wavelength band automatically after swapping the first optical channel with the another channel.

37. The system of claim 1, further comprising a hyperspectral imager for processing any of the first wavelength band and one or more second wavelength bands.

38. The system of claim 1, further comprising a housing for encasing at least the first imaging module, except for a region of the common aperture, and wherein at least one of the one or more second wavelength bands comprises a second optical channel within the housing that is modularized to be mechanically swappable with another channel to provide one of (a) repair of the second channel and (b) imaging in another wavelength band.

39. The system of claim 38, wherein the first imaging module further comprises a first post processor coupled with the first detector and the one or more second detectors to process the first wavelength band and the one or more second wavelength bands to form an assembled image, the post-processor being configured to accommodate processing of the another wavelength band automatically after swapping the second optical channel with the another channel.

40. A common aperture multi-mode optical system, comprising:
  reflective first fore-optics for imaging electromagnetic radiation through a common aperture to an intermediate image plane;
  a removably-attachable first imaging module configured for attachment to the reflective first fore optics, the first imaging module having:
    (a) a first beam-splitter for dividing the electromagnetic radiation through the common aperture between a first wavelength band and one or more second wavelength bands,
    (b) a first detector for detecting the first wavelength band,
    (c) one or more second detectors for detecting the second wavelength bands; and
    (d) one or more refractive elements transmissive to the second wavelength bands, for imaging the second wavelength bands to the second detectors.

41. The system of claim 40, further comprising a second imaging module for providing imaging of one or more third wavelength bands, the second imaging module being swappable with the first imaging module and removably-attachable to the first fore-optics, the second imaging module having:
  (a) a second beam-splitter for dividing the electromagnetic radiation through the common aperture between a third wavelength band and one or more fourth wavelength bands,
  (b) a third detector for detecting the third wavelength band,
  (c) one or more fourth detectors for detecting the fourth wavelength bands; and
  (d) one or more refractive elements transmissive to the fourth wavelength bands, for imaging the second wavelength bands to the second detectors.

* * * * *